(12) United States Patent
Rickman et al.

(10) Patent No.: US 11,240,572 B2
(45) Date of Patent: Feb. 1, 2022

(54) OPTOELECTRONIC SWITCH WITH REDUCED FIBRE COUNT

(71) Applicant: ROCKLEY PHOTONICS LIMITED, London (GB)

(72) Inventors: Andrew Rickman, Marlborough (GB); Cyriel Johan Agnes Minkenberg, Neuheim (CH)

(73) Assignee: Rockley Photonics Limited, Altrincham (GB)

( * ) Notice: Subject to any disclaimer, the term of this patent is extended or adjusted under 35 U.S.C. 154(b) by 194 days.

(21) Appl. No.: 16/491,561

(22) PCT Filed: Mar. 5, 2018

(86) PCT No.: PCT/IB2018/000279
§ 371 (c)(1),
(2) Date: Sep. 5, 2019

(87) PCT Pub. No.: WO2018/162978
PCT Pub. Date: Sep. 13, 2018

(65) Prior Publication Data
US 2021/0144456 A1 May 13, 2021

(30) Foreign Application Priority Data
Mar. 6, 2017 (GB) ..................................... 1703546

(51) Int. Cl.
*H04Q 11/00* (2006.01)
(52) U.S. Cl.
CPC .................. *H04Q 11/0005* (2013.01); *H04Q 2011/0016* (2013.01); *H04Q 2011/0032* (2013.01); *H04Q 2011/0052* (2013.01)
(58) Field of Classification Search
CPC ................................................ H04Q 11/0005
See application file for complete search history.

(56) References Cited

U.S. PATENT DOCUMENTS

| 7,389,046 B1 | 6/2008 | Tanaka et al. |
| 9,602,434 B1 * | 3/2017 | Saleh ................. H04Q 11/0066 |

(Continued)

FOREIGN PATENT DOCUMENTS

| GB | 2544130 A | 5/2017 |
| WO | WO 2014/175835 A1 | 10/2014 |
| WO | WO 2015/124952 A1 | 8/2015 |

OTHER PUBLICATIONS

Unpublished U.S. Appl. No. 16/487,782, filed Aug. 21, 2019.
International Searching Authority; Notification of Transmittal of the International Search Report and the Written Opinion of the International Searching Authority, or the Declaration; International Application No. PCT/IB2018/000279; International Filing Date Mar. 5, 2018; 16 pgs.

(Continued)

*Primary Examiner* — Shi K Li
(74) *Attorney, Agent, or Firm* — Lewis Roca Rothgerber Christie LLP

(57) ABSTRACT

An optoelectronic switch for transferring an optical signal from a source external client device to a destination external client device, includes a leaf rack unit having thereon a leaf switch assembly including: a leaf switch having a plurality of fabric ports including a first fabric port and a second fabric port; and a fabric port multiplexer associated with the leaf switch, arranged to combine a first signal from the first fabric port and a second signal from the second fabric port onto a first connection, in the form of an outgoing first multiplexed signal. The optoelectronic switch further includes a spine rack unit including: a plurality of spine switches including a first spine switch having a fabric port and a second spine switch having a fabric port; and a demultiplexer arranged to separate an incoming multiplexed signal received from a first connection into a first signal and a second signal, the first signal directed towards the fabric port of the first spine switch and the second signal directed towards the fabric port of the second spine switch.

26 Claims, 14 Drawing Sheets

(56) References Cited

U.S. PATENT DOCUMENTS

| | | | |
|---|---|---|---|
| 2006/0171712 A1 | 8/2006 | Tanaka et al. | |
| 2007/0110439 A1 | 5/2007 | Beshai et al. | |
| 2010/0021166 A1* | 1/2010 | Way | H04J 14/0256 |
| | | | 398/79 |
| 2014/0025843 A1 | 1/2014 | Marr et al. | |
| 2014/0056371 A1 | 2/2014 | Ji et al. | |
| 2014/0119728 A1* | 5/2014 | Zhang | H04J 14/0212 |
| | | | 398/48 |
| 2015/0230007 A1 | 8/2015 | Hessong et al. | |
| 2015/0295655 A1* | 10/2015 | Hessong | H04B 10/27 |
| | | | 398/58 |
| 2015/0373433 A1* | 12/2015 | McLaren | H04Q 11/0071 |
| | | | 398/49 |
| 2017/0026116 A1* | 1/2017 | Sprem | H04B 10/25891 |

OTHER PUBLICATIONS

Pathak, et al.; IEEE Photonics Journal; Comparison of AWGs and Echelle Gratings for Wavelength Division Multiplexing on Silicon-on-Insulator; vol. 6, No. 5, Oct. 2014; 10 pgs.

GB Intellectual Property Office, Patents Directorate, Search Report dated Jun. 14, 2017; Application No. GB1703546.0; 5 pgs.

GB Intellectual Property Office, Patents Directorate, Search Report dated Oct. 10, 2017; Application No. GB1703546.0 (Claim 46); 3 pgs.

GB Intellectual Property Office, Patents Directorate, Search Report dated Oct. 10, 2017; Application No. GB1703546.0 (Claims 44 and 45); 3 pgs.

U.K. Intellectual Property Office Examination Report, dated Jul. 5, 2021, for Patent Application No. GB 1703546.0, 7 pages.

* cited by examiner

OPTOELECTRONIC SWITCH WITH REDUCED FIBRE COUNT

CROSS-REFERENCE TO RELATED APPLICATION(S)

This application is a national stage entry, under 35 U.S.C. § 371, of International Application Number PCT/IB2018/000279, filed on Mar. 5, 2018, which claims priority to and the benefit British Patent Application Number 1703546.0, filed Mar. 6, 2017. The entire contents of all of the applications identified in this paragraph are incorporated herein by reference.

FIELD OF THE INVENTION

The present invention relates to an optoelectronic switch for transferring a signal from a source external client device to a destination external client device. In particular, the invention leads to a lower overall fibre count.

BACKGROUND TO THE INVENTION

In optoelectronic chassis switches, there may be two types of switching elements: leaf switches or leaves, and spine switches or spines. Leaves are switches which are connected to external client devices via client ports. Signals, either optical or electrical may be switched from one leaf to another via one or more spines. Alternatively, signals may be switched between two client ports on the same leaf, also via one or more spines. For convenience, several leaves and/or spines may be packaged onto a single chassis module, which may span one or more rack units (RUs). Specifically, there may be separate leaf chassis modules and spine chassis modules, with connections running between them, between ports on the leaves and ports on the spines. In conventional switches, a link in the form of an optic fibre pair exists between each leaf and each spine. In other words, there is a fibre pair associated with each port on a given leaf. In large optoelectronic switches, this means that a very large number of connections may be required, for example, consider the case where there are 20 leaves and 20 spines, each leaf requiring a connection to each spine—this is a total of 400 fibre pairs. Typically, in order to have the required capacity, far larger switches are required, which clearly quickly escalate and give rise to a requirement for thousands upon thousands of fibre pairs.

A schematic example of this is shown in FIG. 1A. In this one-dimensional example, twelve leaf switches L1 to L12 are connected together by six spine switches S1 to S6. Each leaf switch is connected to each spine switch, and accordingly each spine switch is connected to each leaf switch. This requires twelve connections originating at each spine switch, or six connections originating in each spine switch. Accordingly, there are seventy-two connections (each requiring a fibre pair) in total. FIG. 1B shows a similar example, but highlights the packaging aspects of the optoelectronic switch. Specifically, the twelve leaf switches are divided between two leaf rack units, each having six leaf switches thereon.

These are both connected to a spine rack unit, having six spine switches thereon. When implemented, these different rack units are spatially separated, and so require connections running between them. These are the same seventy-two connections as shown in FIG. 1A, except leaf switches L1 to L6 are located on a separate rack unit from leaf switches L7 to L12. Having this number of connections is clearly unwieldy.

In some cases, the ports on switching elements may be made up of a plurality of physical lanes or channels (e.g. 4×25 G lanes for a single 100 G port, or 8×50 G for a single 400 G port). Having separate physical lanes further increases the number of fibre pairs required to connect the leaves and spines. However, in some optoelectronic switches, coarse wavelength-division multiplexing may be employed to multiplex the lanes of one port onto a single fibre pair, the signal from each lane being carried at a different optical carrier wavelength. However, this still does not eliminate the requirement that a pair of optic fibres is required between every port on a given leaf switch and corresponding ports on the spine switches to which that leaf switch is connected. It is an object of the present invention to provide an optoelectronic switch with a greatly reduced fibre count, but without making any sacrifices in the performance of such a switch.

SUMMARY OF THE INVENTION

In order to reduce the fibre count, the present invention provides an optoelectronic switch which multiplexes together signals from a plurality of ports, before transmitting them to a separate rack unit. In doing so, there is no need to have a pair of connections running between each port on each leaf switch to each of the spine switches. Specifically, the present invention achieves this by the provision of an optoelectronic switch for transferring an optical signal from a source external client device to a destination external client device, the optoelectronic switch including:

a leaf rack unit having thereon a leaf switch assembly including:
  a leaf switch having a plurality of fabric ports including a first fabric port and a second fabric port; and
  a fabric port multiplexer associated with the leaf switch, arranged to combine a first signal from the first fabric port and a second signal from the second fabric port onto a first connection, in the form of an outgoing first multiplexed signal, and a spine rack unit including:
  a plurality of spine switches including a first spine switch having a fabric port and a second spine switch having a fabric port; and
  a demultiplexer arranged to separate an incoming multiplexed signal received from a first connection into a first signal and a second signal, the first signal directed towards the fabric port of the first spine switch and the second signal directed towards the fabric port of the second spine switch.

Such an optoelectronic switch provides clear advantages over the prior art. Previously, it was necessary to have a connection bridging the leaf rack unit and the spine rack unit between every fabric port on the leaf switch and the spine switches to which they were connected. However, the present invention reduces the number of required connections by combining all of the signals on a given leaf switch into a single connection, using a fabric port multiplexer. These signals are then split back into their constituent signals by the fabric port demultiplexer on the spine rack unit.

Optional features of the invention will now be set out. These are applicable singly or in any combination with any aspect of the invention.

In the present invention, the source and destination external client devices may be connected to the optoelectronic switch via client ports on the leaf switches, each for connection to an external client device.

In addition to combining the signals from only the first fabric port and the second fabric port, in some embodiments, each of the plurality of fabric ports may be arranged to convey a respective signal, and the fabric port multiplexer may be arranged to combine the signals from each of the plurality of fabric ports on the first connection in the form of a first multiplexed signal. It should be noted that even though each of the fabric ports is arranged to convey a respective signal, this does not mean that in use a signal is necessarily conveyed by every one of the fabric ports at a given time. Rather, it should be understood that each of the fabric ports is able to convey a signal, should one be incident at that fabric port. The same is true, where compatible, throughout this application.

As well as transmitting signals from the leaf rack unit to the spine unit, as discussed above, the leaf switch assembly may also be configured to receive multiplexed signals from the spine rack unit. In order to achieve this, the leaf switch assembly may further include a fabric port demultiplexer associated with the leaf switch, arranged to separate an incoming second multiplexed signal received from a second connection into a third signal directed towards the first fabric port, and a fourth signal directed towards the second fabric port. The nature of the first and second connections of the present invention are described in more detail later on in the application.

In embodiments in which the leaf switch assembly is also able to receive multiplexed signals, specifically the incoming second multiplexed signal from the second connection, rather than the fabric port demultiplexer being arranged only to direct signals towards the first fabric port and the second fabric port, it may be able to separate the incoming signal across all of the plurality of fabric ports. In other words, each of the plurality of fabric ports of the leaf switch may be arranged to convey a respective signal, and the fabric port demultiplexer may be arranged to separate the second multiplexed signal from the second connection into a plurality of constituent signals, a respective one of which is directed to each of the plurality of fabric ports.

In embodiments as described above, by multiplexing signals onto the first connection, the total number of connections required between the leaf rack unit and the spine rack unit is reduced by a given factor, that factor being equivalent to the number of fabric ports in the plurality of fabric ports. This is the case in embodiments in which there is only a single leaf switch assembly on the rack unit. However, embodiments in which there are a plurality of leaf switch assemblies on the leaf rack unit are described in detail later on in the application.

In some embodiments, one or both of the fabric port multiplexer and the fabric port demultiplexer may be in the form of an arrayed waveguide grating (AWG). Alternatively an Echelle grating may be used. AWGs are passive optical components which are able to combine signals having different wavelengths into a signal connection, perhaps by making use of the fact that the refractive index of a material varies with the wavelength of the light incident upon that material. Specifically, at least the first signal and the second signal may be combined using wavelength-division multiplexing (WDM). This technique makes use of the fact that signals having different wavelengths do not interfere with each other. Either coarse wavelength-division multiplexing (CWDM) or dense wavelength-division multiplexing (DWDM) may be used to combine the first and second signals. The difference between the two is the channel spacing, i.e. the difference in wavelength between one of the signals to be multiplexed (e.g. the first signal) and the adjacent signal to be multiplexed (e.g. the second signal). For CWDM, the channel spacing may be approximately 10 nm to 30 nm, preferably 15 nm to 25 nm and most preferably approximately 20 nm. However in DWDM the channel spacing is far closer. For example, in some embodiments, the channel spacing may approximately 0.5 nm to 1.5 nm, and is preferably approximately 1 nm. Clearly, embodiments employing DWDM present the advantage that far more channels can be fit into a given spectral range, therefore preferred embodiments of the present invention employ DWDM rather than CWDM.

In some embodiments of the present invention, the fabric port demultiplexer and the fabric port multiplexer may be the same component, such as an AWG, though in other embodiments, they may be separate components, which may both be AWGs.

In prior art optoelectronic switches, it may be the case that each of the connections going from one fabric port to another may already have some kind of multiplexing. Specifically, each fabric port may include a plurality of physical lanes or channels, which are multiplexed into e.g. a single optical fibre. However, the present invention is able to further improve on this, by combining the signals not only from the lanes making up each individual fabric port, but also by combining the signals from each port. Specifically, the first port of the leaf switch may include a plurality of physical lanes, each having an associated lane multiplexer, the multiplexer arranged to combine signals from each of the plurality of physical lanes to form the first signal. So, in other words the first signal may be a multiplexed signal made up of a combination of the signals from each of the plurality of physical lanes making up that fabric port. In addition to the first fabric port as, each of the plurality of fabric ports on a given leaf switch may include a plurality of physical lanes and an associated lane multiplexer, each of the lane multiplexers being arranged to combine signals from the plurality of physical lanes on the fabric port with which that lane multiplexer is associated.

The term "physical lanes" may refers to e.g. an individual optical fibre, or a single conductive trace or wire contained within the fabric port in question. Specifically, a physical lane may be in the form of a Tx/Rx pair, and may be defined by the capability of the electrical serdes. The advantages of DWDM become clearer when considering embodiments in which this is the case. Consider for example a leaf switch including six fabric ports each made up of 4×100 G physical lanes. In order to combine these together, it is necessary to combine 24 individual signals. Employing DWDM to do so is clearly advantageous over using CWDM, particularly given that a narrow spectral range may be required.

In embodiments having a plurality of lanes in one or more of the fabric ports, it desirable to include a lane demultiplexer to separate these signals back out. For example, in some embodiments the first fabric port of the leaf switch may have an associated lane demultiplexer, the lane demultiplexer arranged to separate the third signal into a plurality of constituent signals each directed to a respective one of the plurality of physical lanes. Furthermore, each of the plurality of fabric ports of the leaf switch may include a plurality of physical lanes, and an associated lane demultiplexer, each of the lane demultiplexers arranged to separate signals from the fabric port with which it is associated into a plurality of constituent signals, each of which is directed to a respective one of the plurality of physical lanes of that fabric port.

From the above, it emerges that there may be more than one stage of multiplexing or demultiplexing. The lane multiplexers/demultiplexers may be referred to as a first stage, and the fabric port multiplexers/demultiplexers may be referred to as a second stage. In some embodiments, multiplexing/demultiplexing in both the first stage and the second stage may be performed by the same component, in other words, for example, a single multiplexer may combine the signals from each lane of each fabric port, and vice versa in the opposite direction. Such an arrangement is advantageous from a link power budget point of view. In some embodiments of the present invention, there may be one or more additional stages, containing multiplexers and corresponding demultiplexers. For example, in some embodiments, there may be a first and second fabric port multiplexer on the leaf rack unit, wherein the first fabric port multiplexer is arranged to combine signals from the first fabric port and the second fabric port, and the second fabric port multiplexer is arranged to combine signals from a third fabric port and a fourth fabric port, to give multiplexed signals. Then, the leaf rack unit may further include an additional multiplexer, which may be referred to as a "third stage" multiplexer, which is arranged to combine the signals from the first fabric port multiplexer and the second fabric port multiplexer, into an outgoing first twice-multiplexed signal.

Then, accordingly that leaf switch may include a first fabric port demultiplexer and a second fabric port demultiplexer, as well as a "third stage" demultiplexer. In this case, the "third stage" demultiplexer is arranged to separate an incoming second twice-multiplexed signal into its constituent signals, each of which is a multiplexed signal. Then, the first fabric port demultiplexer and the second fabric port demultiplexer are arranged to separate each of these multiplexed signals into their constituents, and direct them respectively to the first fabric port, second fabric port, third fabric port, and third fabric port (whereupon they may be further split across the physical lanes).

From the above, it is clear to the skilled person that this may be extended into an embodiment having a fourth stage, a fifth stage, a sixth stage etc. The limit in such cases is the number of channels which can be combined onto a single connection, which is determined by the "density" of the WDM used. It may also be limited by insertion loss, since there is a loss of optical power associated with each stage of multiplexing. It should be noted that an analogous three-stage multiplexing arrangement may be present on the spine switch side of the optoelectronic switch.

There may also be embodiments in which a third stage of multiplexing/demultiplexing is used to combine signals from a plurality of leaf switches. This is discussed in more depth later on in the application.

In preferred embodiments of the present invention, the leaf switch and the fabric port multiplexer and/or fabric port demultiplexer (i.e. the leaf switch assembly) are integrated onto a single leaf switch module. In the present application, the terms "leaf switch module" and "leaf switch assembly" should be distinguished from each other in that the leaf switch module is a single integrated unit, whereas the leaf switch assembly refers only to the components which may be integrated to form a leaf switch module.

Integration of components in this manner is advantageous in terms of both ease-of-implementation and also in reducing the size of the entire arrangement. In other words, rather than being two or three separate components, the leaf switch assembly may be a single module. In some embodiments, the components may be implemented in silicon photonics dies that are co-packages in a CMOS die in the same module package. Such a module may have a maximum dimension of no more than 10 cm, and preferably approximately 5 cm. Integration of the multiplexers/demultiplexers and the leaf switch itself also leads to a reduction in optical loss.

In preferred embodiments of the present invention, the leaf rack unit may include a plurality of leaf switch assemblies (or leaf switch modules) located thereon, including a first leaf switch assembly and a second leaf switch assembly. In some embodiments, the plurality of leaf switch assemblies may be no fewer than 5 and no more than 25. In preferred embodiments, the plurality of leaf switches may include no fewer than 10 and no more than 20. This is advantageous in that it allows more external client devices to be connected to each other. Furthermore, having a plurality of leaf switch assemblies on a single leaf rack unit results in simpler assembly of the optoelectronic switch of the present invention. In some embodiments, the leaf switch assemblies or leaf switch modules may be integrated together, and the leaf rack unit accordingly may form a single integrated component. In embodiments in which there are a plurality of leaf switch assemblies on the leaf rack unit, each of the leaf switch assemblies may be identical or substantially identical. For example, each of the leaf switch assemblies may include the same number of fabric ports. Other components contained within the leaf switch assembly may also be identical or substantially identical. Of course, in embodiments in which the leaf switch assemblies are integrated into single leaf switch modules, the integrated leaf switch modules may be identical or substantially identical to each other. This provides the advantage that the optoelectronic switch may be easily assembled. By requiring only a number of identical components, the switch is effectively modular, and may be assembled to the desired size. Customized assembly, as it were, would not be possible if there were a great deal of variation between the different components used in the switch. In some embodiments, the optoelectronic switch may include a plurality of leaf rack units, each of which may have any of the compatible optional features set out in this section of the application.

As we alluded to earlier, in embodiments in which there are a plurality of leaf switch assemblies, there may be an additional (e.g. third) stage of multiplexers arranged to combine the signals from each of these leaf switch assemblies (specifically from the fabric port multiplexers of the leaf switch assemblies), which may be referred to as assembly multiplexers. Specifically, in some embodiments, a first fabric port multiplexer associated with a first leaf switch may be arranged to combine the signals from all of the fabric ports of the leaf switch into a multiplexed signal. Then, a second fabric port multiplexer associated with a second leaf switch may be arranged to combine the signals from all of the fabric ports of the second leaf switch into a multiplexed signal. Then, an assembly leaf switch may be arranged to combine the multiplexed signals from the first fabric port multiplexer and the second fabric port multiplexer to generate a first twice-multiplexed signal.

Then accordingly, the leaf rack unit may include an assembly demultiplexer which is arranged to separate and incoming second twice-multiplexed signal into its constituent (once) multiplexed signals, one of which is directed to the first fabric port demultiplexer (of the first leaf switch assembly), and one of which is directed towards the second fabric port demultiplexer (of the second leaf switch assembly) whereupon the multiplexed signals are separated into their constituent signals, and directed towards the respective fabric ports of the first and second leaf switches.

The above description focuses on the optional features related to the leaf switches, leaf switch assemblies and leaf rack units. Now, we move on to the optional features related to the spine switches and spine rack units.

In addition to the demultiplexer on the spine rack unit being arranged to separate the first multiplexed signal into just a first and second signal, a respective fabric port on each of the plurality of spine switches on the spine rack unit may be arranged to convey a respective signal, and the demultiplexer on the spine rack unit may be arranged to separate the first multiplexed signal into a plurality of constituent signals, a respective one of which is directed towards a fabric port on each of the plurality of spine switches.

In order to generate the second multiplexed signal, as discussed earlier in this application, the spine switch may include a multiplexer arranged to combine a third signal from the first spine switch and a fourth signal from the second spine switch onto a second connection, in the form of an outgoing second multiplexed signal. As an extension of this, a respective fabric port on each of the plurality of spine switches on the spine rack unit is arranged to convey a respective signal; and the multiplexer is arranged to combine the signals from the fabric ports of each respective one of the plurality of spine switches onto the second connection, in the form of the second multiplexed signal. It is then this second multiplexed signal which may be received at the fabric port demultiplexer of the leaf switch.

As with for the leaf switches, in some embodiments, one or both of the multiplexer and the demultiplexer on the spine switches may be in the form of an arrayed waveguide grating (AWG). As above, either CWDM or DWDM may be used, though DWDM is preferred. In some embodiments of the present invention, the fabric port demultiplexer and the fabric port multiplexer may be the same component, e.g. an AWG, though in other embodiments, they may be separate components, which may both be AWGs.

In some embodiments of the present invention, the spine rack unit may include a plurality of demultiplexers, each arranged to separate an incoming multiplexed signal from a single connection into its constituent signals, each of the constituent signals being directed to a respective spine switch of the plurality of spine switches on the spine rack unit. Correspondingly, in some embodiments, there may be a plurality of multiplexers on the spine rack unit, each arranged to combine a plurality of signals, each from a respective one of the plurality of spine switches, onto a single connection, in the form of an outgoing multiplexed signal.

In order to provide connectivity between the spine switches and the multiplexers/demultiplexers, the spine rack unit may include an optical interconnecting region which provides a full mesh connection between each of the multiplexers and/or demultiplexers and each of the spine switches. The optical interconnecting region may include a passive fibre shuffle, wherein the term "fibre shuffle" is used to refer to an array of optical fibres which provide connections (preferably one-to-one connections) between an array of inputs and an array of outputs.

Again, as with the leaf switches, it may be the case that each of the connections going from one fabric port to another may already have some kind of multiplexing. Specifically, the fabric port of the first spine switch on the spine rack unit may include a plurality of physical lanes and has an associated lane demultiplexer, the lane demultiplexer arranged to separate the first signal into a plurality of constituent signals each directed to a respective one of the plurality of physical lanes. In other words, the first signal is separated into its constituent signals which were carried on the plurality of channels when it reaches the spine switch. Rather than just the fabric port on the first spine switch, the same may apply for the fabric ports on each of the spine switches on the spine rack unit. In other words, the respective fabric port of each one of the plurality of spine switches may include a plurality of physical lanes and have an associated lane demultiplexer, each of the lane demultiplexers being arranged to separate signals arriving at that fabric port into a plurality of constituent signals, each of which being directed to a respective one of the plurality of physical lanes of that fabric port.

In embodiments in which the fabric ports of the spine switches include a plurality of lanes, it is desirable to include a lane multiplexer to combine the signals back together. For example, the fabric port of the first spine switch on the spine rack unit may include a plurality of physical lanes and have an associated lane multiplexer, the lane multiplexer arranged to combine signals from each of the plurality of physical lanes to form the third signal. To extend this to all of the spine switches, the respective fabric port of each one of the plurality of spine switches on the spine rack unit may include a plurality of physical lanes and have an associated lane multiplexer, each of the lane multiplexers being arranged to combine signals from the plurality of physical lanes of the fabric port with which that lane multiplexer is associated. As described earlier with reference to the leaf switches, in some embodiments, the lane multiplexing and fabric port multiplexing (and the corresponding demultiplexing) may be performed by the same physical device.

Up to this point, we have discussed the features of the leaf rack units and spine rack units individually. Now, we consider how they are arranged relative to each other, and more importantly, connected to each other.

As may be evident from the preceding description, each leaf switch assembly on the leaf rack unit may have an associated multiplexer/demultiplexer (i.e. multiplexer and/or demultiplexer, preferably both) on the spine rack unit. Specifically, the fabric port multiplexer on a given leaf switch assembly may be connected to its associated demultiplexer on the spine rack unit via the first connection. Correspondingly, the fabric port demultiplexer on a given leaf switch assembly may be connected to its associated multiplexer on the spine rack unit via the second connection. In preferred embodiments, the first connection and the second connection are in the form of a pair of optical fibres, though in some embodiments, they may be the same single fibre, with signals travelling both ways therethrough. Each spine switch preferably has a respective fabric port associated with each of the leaf switch assemblies in the plurality of leaf switch assemblies.

The operation of the switch will now be described briefly, to highlight some additional features of the components discussed above. In particular, the way in which a signal is routed from its source external client device to its destination external client device will be highlighted. Each leaf switch in the optoelectronic switch preferably includes a switching part which is arranged to direct a signal from a client fabric port on the leaf switch to another fabric port on the leaf switch (as discussed above). Similarly, each spine switch in the optoelectronic switch preferably includes a switching part arranged to actively direct a signal from one of the fabric ports on that spine switch to another fabric port on that spine switch. The switching part of the leaf switch and of the spine switch are active components, in that they are able to actively select to which fabric port they should direct a signal, for example based on information contained in that signal. In some embodiments, the signal may be in the form of a packet of data, which includes information relating to its destination external client device, and in those embodiments, the switching part may use this information to select the fabric port to which that signal should be directed. The switching parts of the leaf switch(es) and spine switch(es) are preferably the only active components in the optoelectronic switch. A detailed description of the operation of active switches which may be used in the leaf switches and spine switches may be found for example in PCT/EP2016/076755, WO2016/170357 and PCT/EP2016/076756. The multiplexers, demultiplexers and the optical interconnecting regions are preferably passive components.

This means that they play no part in actively directing the signal to its destination. They effectively provide a set of paths for the signal, and the path that is taken by the signal is dependent only on the signal itself, there is no "active" selection of a path per se.

More specifically, in the present invention, the path of a given signal is preferably dependent on the wavelength of that signal. The wavelength of the signal may be chosen using a detector remodulator arrangement inside the leaf switch such as those described in detail in WO2015/124953, WO2015/124954 and WO2015/124952. Specifically, the route is determined by sending a given signal at a specific wavelength. In order to achieve this, the first signal may have a first wavelength, and the second signal may have a second wavelength different from the first, the fabric port multiplexer may be arranged to combine the first signal and the second signal onto the first connection in the form of the first multiplexed signal and the demultiplexer on the spine switch may be arranged to direct signals having the first wavelength to the first spine switch and signals having the second wavelength to the second spine switch. In this way, it is possible to direct the first signal to the first spine switch and the second signal to the second spine switch.

In preferred embodiments of the present invention, the leaf switch includes a photonics circuit, preferably a silicon photonics circuit. In preferred embodiments, the leaf switch may include two such photonics circuits, one configured to convert an optical signal into an electrical signal, and one configured to convert an electrical signal into an optical signal. This is what is referred to by a detector-remodulator arrangement above. In preferred embodiments of the present invention, the fabric port multiplexer and/or fabric port demultiplexer is integrated with a photonics circuit to form a single component. In preferred embodiments, the multiplexer is an AWG which is integrated with a V-groove on a substrate, which may be an SOI wafer or a double SOI wafer. Herein, a double SOI wafer is one including two buried oxide layers.

To further generalize this to the case in which the plurality of fabric ports on the leaf switches includes more than two, it may be said that each fabric port on the leaf switch is arranged to convey a signal having a respective associated optical carrier wavelength, wherein no two fabric ports in the plurality of fabric ports on the leaf switch have the same associated wavelength, the fabric port multiplexer is arranged to combine the signal from each respective fabric port into a multiplexed signal, and the demultiplexer on the spine switch may be arranged to separate the multiplexed signal into its constituent signals, and to direct each constituent signal to a respective spine switch on the spine rack unit based on the wavelength of that constituent signal.

Here, the term "wavelength" should not be taken to mean that the optical carrier wavelengths are entirely monochromatic. In reality, the band of a carrier wavelength should preferably be as narrow as possible. When two wavelengths are said to be "different" this should be taken to mean that the bands do not substantially overlap and preferably there is no overlap between bands, since it can be important to eliminate, or at least minimise, optical cross-talk.

The same process works the other way around. The third signal may have a third wavelength, and the fourth signal may have a fourth wavelength different from the third wavelength, the multiplexer on the spine switch may be arranged to combine the third signal and the fourth signal onto the second connection in the form of the second multiplexed signal, and the fabric port demultiplexer may be arranged to direct signals having the third wavelength to the first fabric port of the leaf switch, and signals having the fourth wavelength to the second fabric port of the leaf switch. In some embodiments, the first wavelength may be the same as the third wavelength, and the second wavelength may be the same as the fourth wavelength.

Again, this may be generalized to the case where there are more than two spine switches. In this case, each spine switch may include a fabric port arranged to convey a signal having a respective associated wavelength, the multiplexer on the spine switch arranged to combine the signal from each respective spine switch into a multiplexed signal, and the fabric port demultiplexer being arranged to separate the multiplexed signal into its constituent signals, and to direct each constituent signal to a respective fabric port on the leaf switch based on the wavelength of that constituent signal.

In embodiments of the invention in which there are a plurality of leaf switch assemblies on a given leaf rack unit, the above (i.e. relating to selection of destination by the wavelength of a given signal) may apply to each of the leaf switch assemblies, their corresponding multiplexers/demultiplexers on the spine rack unit(s) and the corresponding fabric ports on the spine switches.

As may be evident from the above, the wavelengths of the signals that arrive at any given multiplexer or fabric port multiplexer are preferably all different, in order to minimize interference between those signals when they are combined into a single multiplexed signal.

The (passive) selection of an output of a multiplexer or demultiplexer as described above, based on wavelength, is a property of many multiplexing or demultiplexing devices, such as AWGs, which make use of the wavelength-dependence of refractive index of light passing therethrough. This is explained in more detail in papers such as S. Pathak et al., "Comparison of AWGs and Echelle Gratings for Wavelength Division Multiplexing on Silicon-on-Insulator," IEEE Photonics Journal, vol. 6, no. 5, pp. 1-9, October 2014.

Second and third aspects of the present invention provide, respectively, a leaf switch assembly and a spine rack unit as described above, which may be used in an optoelectronic switch according to the first aspect of the invention. Specifically, a second aspect of the present invention provides a leaf switch assembly for use in the optoelectronic switch of the first aspect of the invention, the leaf switch assembly including: a leaf switch having a plurality of fabric ports including a first fabric port and a second fabric port; and a fabric port multiplexer associated with the leaf switch, arranged to combine a first signal from the first fabric port and a second signal from the second fabric port onto a first connection, in the form of an outgoing first multiplexed signal. A third aspect of the present invention provides a spine rack unit for use in the optoelectronic switch of the first aspect of the invention, the spine rack unit including: a plurality of spine switches including a first spine switch having a fabric port and a second spine switch having a fabric port; and a demultiplexer arranged to separate an incoming multiplexed signal received from a first connection into a first signal and a second signal, the first signal directed towards the fabric port of the first spine switch and the second signal directed towards the fabric port of the second spine switch. It is clear to the skilled person that any of the optional features which have been set out above in relation to the leaf switch assemblies and spine rack units may also apply, where compatible, to the leaf switch assemblies of the second aspect of the invention and the spine rack units of the third aspect of the invention respectively.

Optoelectronic switches according to the present invention may be extended into more than one dimension. Consider an array of leaf switches, arranged in rows and columns, in which a signal may be switched via a spine switch only within the row/column that it is located in. It is possible to perform switching of a signal between one of the leaf switches and any other in a maximum of two hops. This is referred to as a two-dimensional switch. However, in a fourth aspect of the present invention, this may be generalized to N-dimensions, each operating equivalently to the one dimensional optoelectronic switch of the first aspect of the invention. Specifically, a fourth aspect of the present invention provides an N-dimensional optoelectronic switch for transferring a signal from a source external client device to a destination external client device, the optoelectronic switch including:

a plurality of leaf switch assemblies arranged in an N-dimensional array, each leaf switch assembly in the array having an associated N-tuple of co-ordinates giving the location of that leaf switch in each of the N dimensions, wherein each leaf switch assembly is a member of N sub-arrays of leaf switch assemblies, each of the N sub-arrays of which a given leaf switch assembly being associated with a respective one of the N dimensions, and each sub-array having an associated spine rack unit, wherein:
  each leaf switch assembly includes:
    a leaf switch having N sets of fabric ports, a set of fabric ports associated with switching in each of the N-dimension, each set of fabric ports including a first fabric port and a second fabric port and
    a fabric port multiplexer associated with the leaf switch, arranged to combine a first signal from the first fabric port and a second signal from the second fabric port onto a first connection, in the form of an outgoing first multiplexed signal; and
  each spine rack unit includes:
    a plurality of spine switches including a first spine switch having a fabric port and a second spine switch having a fabric port; and
    a demultiplexer arranged to separate an incoming multiplexed signal received from the first connection into the first signal and the second signal, the first signal directed towards the fabric port of the first spine switch and the second signal directed to the fabric port of the second spine switch; and
  each leaf switch in a given leaf switch assembly is able to direct a signal from a fabric port associated with a first dimension, towards a fabric port associated with a second dimension.

As before, each of the optional features associated with the first, second or third aspects of the invention applies equally well to the fourth aspect of the invention.

In the aspects of the invention which are presented above, to put it broadly, fabric port multiplexers combine signals from several ports on a single leaf switch, and multiplexers on the spine rack units combine signals from a plurality of ports on respective spine switches. There are corresponding fabric port demultiplexers and demultiplexers on the spine rack units for separating multiplexed signals out into their constituent signals. However, embodiments are also envisaged in which the roles of the leaf switches and spine switches may be reversed, i.e. there are fabric port multiplexers on the spine rack unit which are arranged to combine signals from a plurality of ports on a single spine switch, and there are multiplexers on the leaf rack units arranged to combine signals from a plurality of ports on respective leaf switches. Specifically, a fifth aspect of the present invention may provide an optoelectronic switch for transferring an optical signal from a source external client device to a destination external client device, the optoelectronic switch including:

a spine rack unit having thereon a spine switch assembly including:
  a spine switch having a plurality of fabric ports including a first fabric port and a second fabric port; and
  a fabric port multiplexer associated with the spine switch, arranged to combine a first signal from the first fabric port and a second signal from the second fabric port onto a first connection, in the form of an outgoing first multiplexed signal, and
a leaf rack unit including:
  a plurality of leaf switches including a first leaf switch having a fabric port and a second leaf switch having a fabric port; and
  a demultiplexer arranged to separate an incoming multiplexed signal received from a first connection into a first signal and a second signal, the first signal directed towards the fabric port of the first leaf switch and the second signal directed towards the fabric port of the second leaf switch.

The same optional features presented above with respect to the first aspect of the embodiment apply equally well here, if the word "leaf" is replaced with "spine" and vice versa. So, for brevity, these features are not repeated here. The skilled person is well-aware of how such embodiments would be implemented from the disclosure above, Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1A:
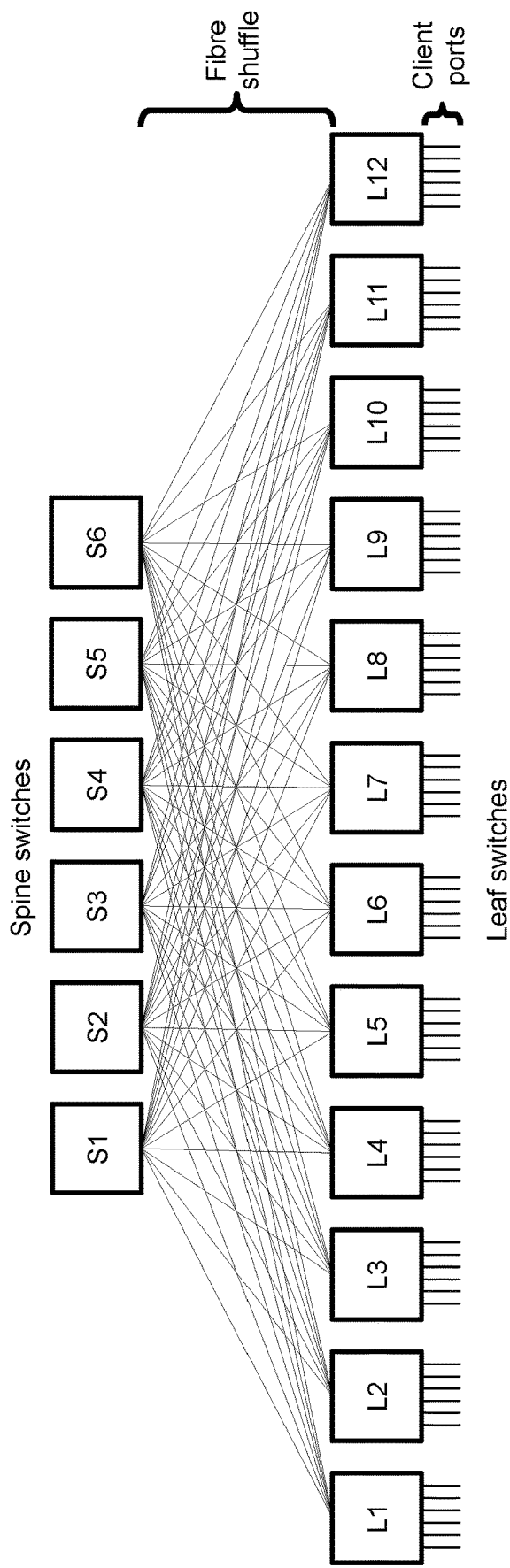
FIGS. 1A and 1B show schematic views of known arrangements of leaf switches and spine switches.
Figure 1B:
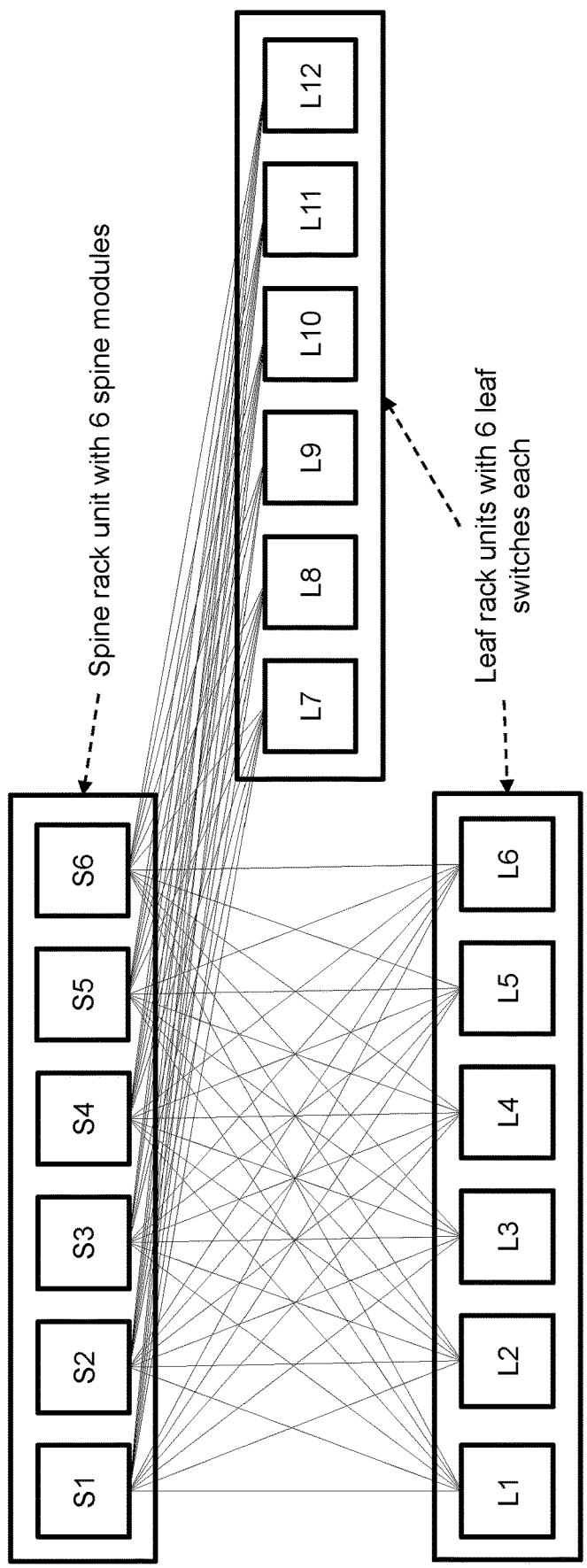
Figure 2:
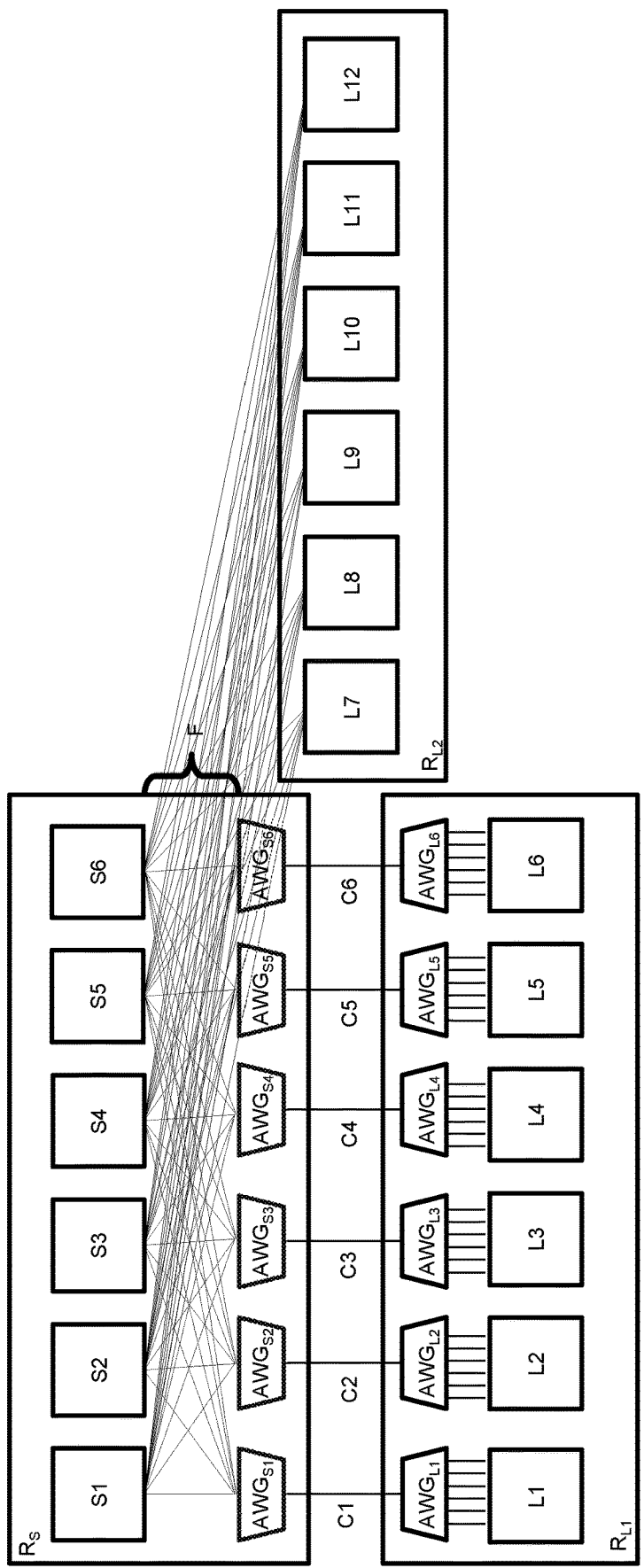
FIG. 2 shows a schematic diagram of an optoelectronic switch according to an embodiment of the first aspect of the invention.

FIG. 2 shows a schematic diagram of an optoelectronic switch according to the present invention. As with FIGS. 1A and 1B, FIG. 2 shows twelve leaf switches L1 to L12 connected via six spine switches S1 to S6. As with FIG. 1B, the spine switches are located on a spine rack unit $R_S$ and the leaf switches are located on two leaf rack units $R_{L1}$ and $R_{L2}$, each having six leaf switches thereon. The arrangement of leaf rack unit $R_{L2}$ is the same as that of the prior art, e.g. as shown in FIG. 1B, but the arrangement of leaf rack unit $R_{L1}$ is improved relative to that. Specifically, each of the leaf switches L1 to L6 includes six fabric ports, shown at the top of the leaf switches. Each of the leaf switches L1 to L6 has an associated arrayed waveguide grating $AWG_{S1}$ to $AWG_{S6}$. It should be noted that in the drawings, each AWG in fact represents two components, an AWG for multiplexing in one direction (either "upwardly" or "downwardly") and an AWG for demultiplexing in the other direction. The reason that the drawings have not shown this is to reduce clutter in the drawing. As discussed above, however, it is envisaged that there may be embodiments in which a single AWG is able to operate in both directions. The connections feeding into the arrayed waveguide gratings $AWG_{L1}$ to $AWG_{L6}$ are in the form of optical fibres, each carrying an optical signal from the leaf switches L1 to L6 to arrayed waveguide gratings $AWG_{L1}$ to $AWG_{L6}$. In the leaf switches L1 to L6, the switching may take place electrically, and then the signal may be converted into an optical signal before being output towards arrayed waveguide gratings $AWG_{L1}$ to $AWG_{L6}$. Within the leaf switches L1 to L6, the signals may be carried on a number of physical lanes per fabric port, though this is explained in greater detail later on in the application.

Each of the arrayed waveguide gratings $AWG_{L1}$ to $AWG_{L6}$ is arranged to combine (i.e. multiplex) up to six signals which are fed into it onto a single connection C1 to C6. Accordingly, the signals which are transmitted from each of the fabric ports on the leaf switches are at different wavelengths, in order to avoid crosstalk when they are combined onto a single one of the connections C1 to C6, which may be in the form of pairs of optical fibres, one of the pair being responsible for transmission of signals in the "upward" direction, the other being responsible for transmission of signals in the "downward" direction.

Here, the advantages of the present invention may be seen: as compared to the example shown in FIG. 1B, the number of connections between the leaf rack unit $R_{L1}$ and the spine rack unit $R_S$ is reduced by a factor of six, by combining the signals from the fabric ports on each of the leaf switches L1 to L6 into a single connection C1 to C6. Multiplexed signals then traverse the gap between the spine rack unit $R_S$ and leaf rack unit $R_{L1}$ on the connections C1 to C6, whereupon they arrive at the spine rack unit $R_S$, and specifically the arrayed waveguide gratings $AWG_{S1}$ to $AWG_{S6}$ located thereon. As is illustrated in FIG. 2, there is an arrayed waveguide grating $AWG_{S1}$ to $AWG_{S6}$ associated with (i.e. connected to) each of the arrayed waveguide gratings $AWG_{L1}$ to $AWG_{L6}$, and accordingly associated with each of the leaf switches L1 to L6.

The arrayed waveguide gratings $AWG_{S1}$ to $AWG_{S6}$ on the spine rack unit $R_S$ then separate the signals on connections C1 to C6 into their six constituent signals, which are equivalent/identical to, or correspond to the signals departing the fabric ports on the leaf switches L1 to L6 with which that arrayed waveguide grating $AWG_{S1}$ to $AWG_{S6}$ is associated. As is shown, each of the demultiplexed signals is then directed towards a different one of the spine switches S1 to S6. The spine rack unit $R_S$ includes a fibre shuffle F, which includes thirty-six individual connections (again in the form of pairs of optical fibres, with one of the pair responsible for "upward" travel, and the other responsible for "downward" travel), providing an interconnection between each of the arrayed waveguide gratings $AWG_{S1}$ to $AWG_{S6}$, and each of the spine switches S1 to S6. It is noted that even though the present invention still includes a large number of optical connections, these connections are confined to the spine rack unit $R_S$, rather than having to traverse the gap, as is the case between e.g. leaf rack unit $R_{L2}$ and spine rack unit $R_S$. In the embodiment of FIG. 2, the fibre shuffle provides a full-mesh connection between the arrayed waveguide gratings $AWG_{S1}$ to $AWG_{S6}$ and the spine switches S1 to S6.

The spine switches S1 to S6, on receiving the signals from the arrayed waveguide gratings $AWG_{S1}$ to $AWG_{S6}$ then switch the signals towards one of their fabric ports. The spine switches may be in the form of electronic packet switches, optical circuit switches or a hybrid of the two which may be referred to as optoelectronic packet switches, though the nature of the switching does not matter for the purposes of this invention. Each of the spine switches S1 to S6 may then send a (now switched) optical signal back towards each of the arrayed waveguide gratings $AWG_{S1}$ to $AWG_{S6}$, via the fibre shuffle F. When travelling in the opposite direction, the arrayed waveguide gratings $AWG_{S1}$ to $AWG_{S6}$ behave as multiplexers, and combine the up to six signals into a single one of the connections C1 to C6 (though this time, it is the other of the pair of optical fibres, that which is responsible for "downward" signals).

The signal then traverses the gap between the spine rack unit $R_S$ and the leaf rack unit $R_{L1}$, and arrives at one of the arrayed waveguide gratings $AWG_{L1}$ to $AWG_{L6}$ whereupon it is demultiplexed into its up to six constituent signals. It should be noted that in the embodiment shown in FIG. 2, the arrayed waveguide gratings $AWG_{L1}$ to $AWG_{L6}$, and $AWG_{S1}$ to $AWG_{S6}$ are able to act as both multiplexers and demultiplexers, depending on which way the signal is travelling therethrough. This is due to the passive nature of an arrayed waveguide grating. However, in other embodiments, a separate component may be used to perform the multiplexing and demultiplexing duties of each of these arrayed waveguide gratings $AWG_{L1}$ to $AWG_{L6}$ and $AWG_{S1}$ to $AWG_{S6}$. Once the multiplexed signals are separated by the arrayed waveguide gratings $AWG_{L1}$ to $AWG_{L6}$, they are sent back to the leaf switches L1 to L6, whereupon they may be forwarded to an external client device (not shown), via a client port.

In the above scheme, it should be noted that the arrayed waveguide gratings $AWG_{L1}$ to $AWG_{L6}$ and $AWG_{S1}$ to $AWG_{S6}$, as well as the fibre shuffle F are entirely passive components and perform no active switching action. The only active switching action is performed by the leaf switches L1 to L6, and the spine switches S1 to S6, in that based on information contained in the signals, which may be packets of data or the like, the spine switches S1 to S6 and leaf switches L1 to L6 are able to select an appropriate fabric port to which to send a signal so that it will be directed towards its intended destination.

Figure 3:
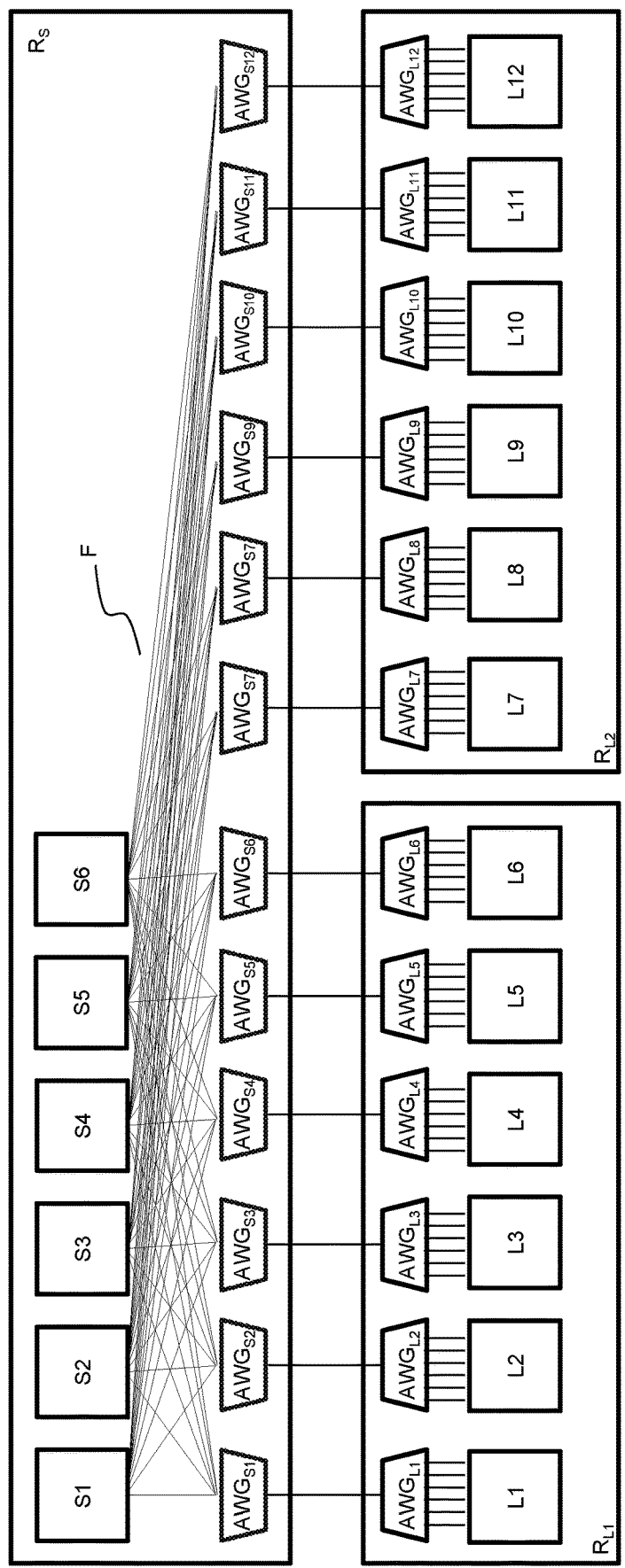
FIG. 3 shows a schematic diagram of an optoelectronic switch according to another embodiment of the first aspect of the invention.

FIG. 3 shows a similar embodiment to FIG. 2. However, in the embodiment of FIG. 3, the second leaf rack unit $R_{L2}'$ also includes arrayed waveguide gratings $AWG_{L7}$ to $AWG_{L12}$, each associated with one of the leaf switches L7 to L12. Each of these has a corresponding associated arrayed waveguide grating $AWG_{S7}$ to $AWG_{S12}$ on the spine rack unit $R_S$. The spine switches S1 to S6 differ in that they each have twelve, rather than six, fabric ports in order to accommodate for the twelve leaf switches L1 to L12. Please note that the client ports are not shown in the drawings.

Figure 4:
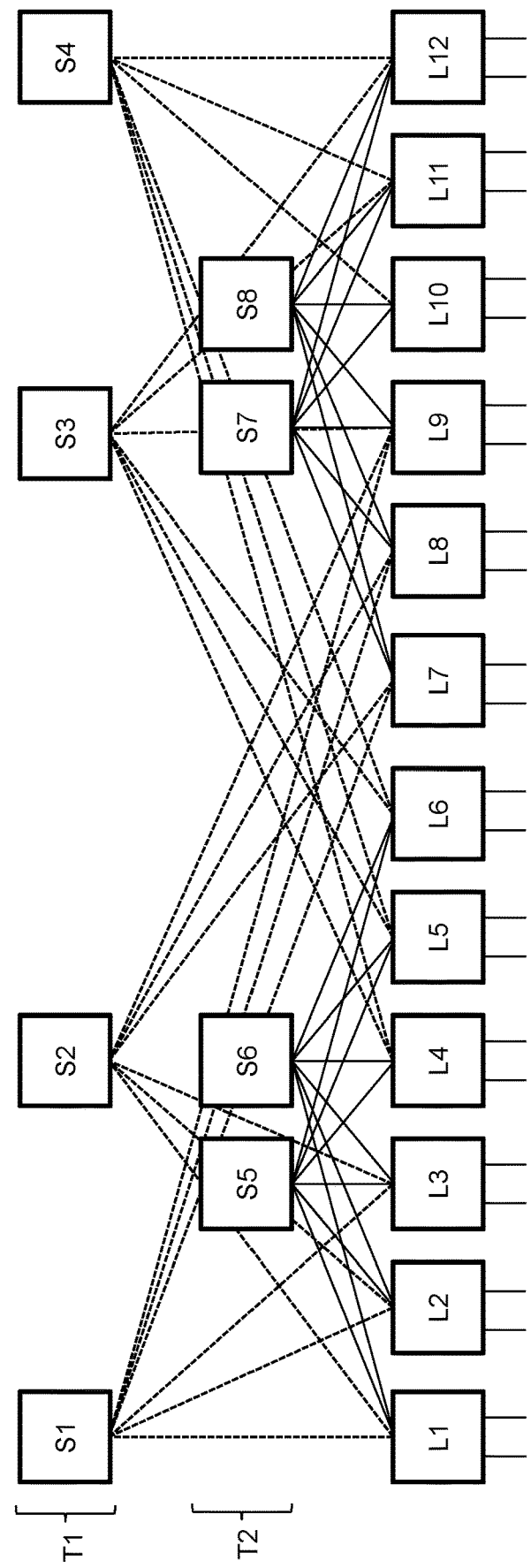
FIGS. 4 and 5 show schematic diagrams of a two-dimensional optoelectronic switch according to another embodiment of the present invention.
Figure 5:
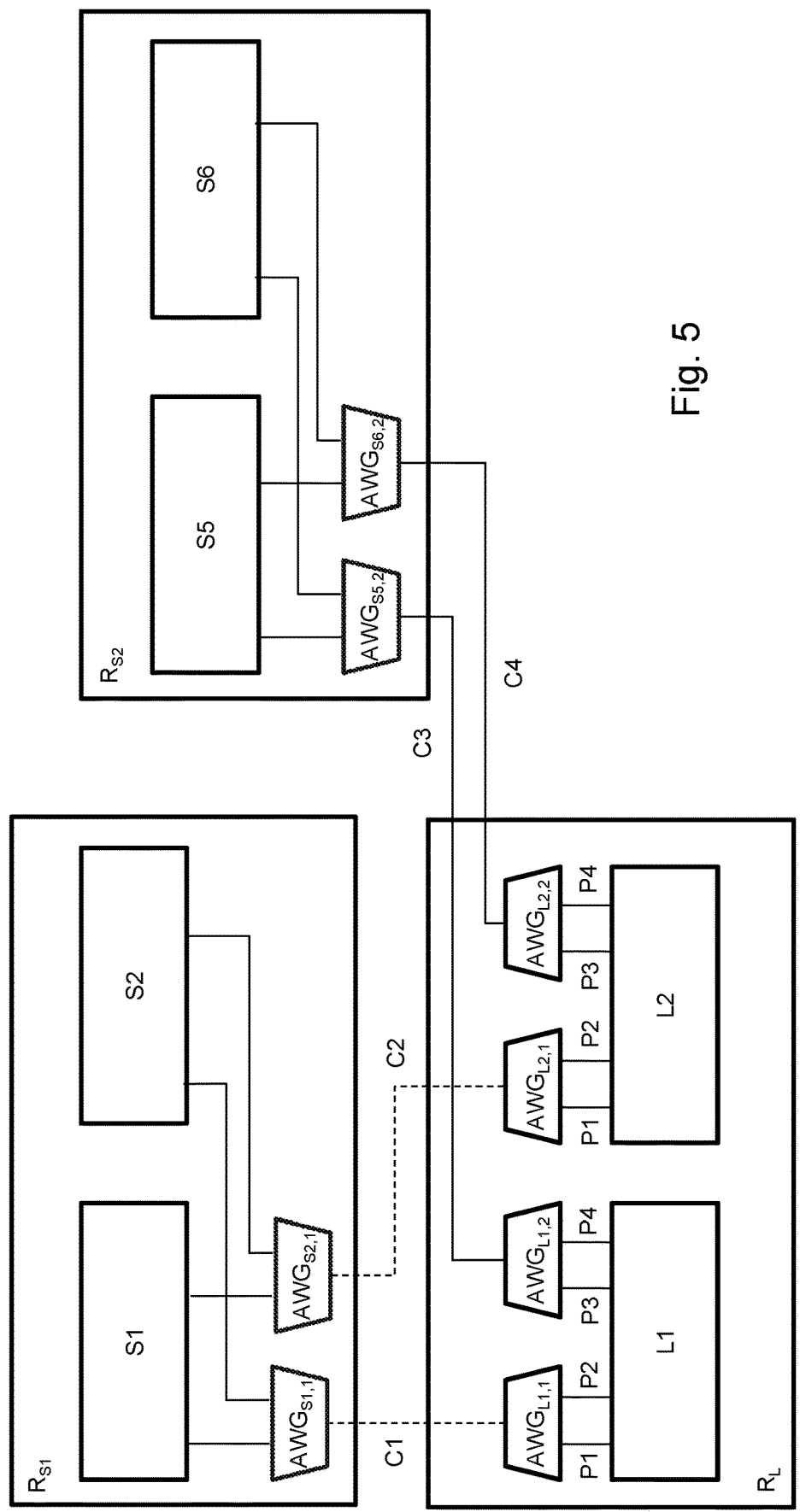

FIGS. 4 and 5 illustrate a two-dimensional embodiment of the present invention. Specifically, FIG. 4 illustrates an example of a network topology which may be employed in embodiments of the present invention, and FIG. 5 shows how the invention may be applied to this topology. These will be discussed in turn below.

In the 2D embodiment of the optoelectronic switch shown in FIG. 4, the spine switches S1 to S8 are divided into two tiers, the first tier T1, containing spine switches S1 to S4 facilitating switching in a first dimension, and the second tier T2, containing spine switches S5 to S8 facilitating switching in a second dimension. It should be noted that the term "dimension" as used herein may, but does not necessarily, mean that the leaf switches L1 to L12 are arranged in rows and columns. Considering first the first dimension: the spine switches are divided into two pairs, {S1,S2} and {S3,S4}. Each of these pairs may be said to "serve", i.e. facilitate switching between a subset of the leaf switches L1 to L12. Specifically, pair {S1,S2} serves the set of leaf switches {L1,L2,L3,L7,L8,L9} and set {S3, S4} serves the set of leaf switches {L4,L5,L6,L10,L11,L12}. The same may be said for the second dimension in which pair {S5,S6} serve the set of leaf switches {L1,L2,L3,L4,L5,L6} and the pair {S7,S8} serve the set of leaf switches {L7,L8,L9,L10,L11,L12}. In FIG. 4, each leaf switch L1 to L12 is connected to a subset of four of the spine switches S1 to S8. This means that if the spine switches S1 to S8 and leaf switches L1 to L12 were packaged equivalently to those in FIG. 1B, there would be forty-eight connections required between spine rack units and leaf rack units.

In such embodiments, a signal may be switched between any two leaf switches from L1 to L12 in a maximum of two hops (one hop in one dimension, and a second hop in the other dimension). Here, the term "hop" refers to a transmission from one leaf switch to another leaf switch via a spine switch.

For example, consider a packet of data travelling from L1 to L11. There is no spine switch in either the first tier T1 or second tier T2 which is connected to both of these leaf switches. So, for example, the packet of data may travel first from L1 to L7 via S1 (i.e. in the first dimension), and then from L7 to L11 via S5 (i.e. in the second dimension).

FIG. 5 shows how the present invention may be applied to an arrangement such as that shown in FIG. 4. In this drawing, only leaf switches L1 and L2 are shown (located on leaf rack unit $R_L$), and only spine switches S1 and S2 (located on spine rack unit $R_{S1}$) from the first dimension and spine switches S5 and S6 (located on spine rack unit $R_{S2}$) from the second dimension are shown. The key difference between the arrangement shown in FIG. 5 and the arrangement of FIG. 2 is that each of leaf switches L1, L2 have a subset of fabric ports P1, P2 associated with switching in the first dimension, and a second subset of fabric ports P3, P4 associated with switching in the second dimension.

The fabric ports P1 and P2 on leaf switches L1 and L2 are responsible for switching in the first dimension. In the following description, the italicized reference numerals in brackets are the corresponding features when the switching is performed in the second dimension, in order to prevent repetition. Accordingly, arrayed waveguide gratings $AWG_{L1,1}$ and $AWG_{L2,1}$ ($AWG_{L1,2}$ and $AWG_{L2,2}$) are also associated with switching in the first dimension, and receive signals from fabric ports P1 and P2 (P3 and P4) on each of the leaf switches L1 and L2. Each of the arrayed waveguide gratings $AWG_{L1,1}$ and $AWG_{L2,1}$ ($AWG_{L1,2}$ and $AWG_{L2,2}$) is arranged to combine (i.e. multiplex) the up to two signals which are fed into it onto a respective single connection C1, C2 (C3, C4). Accordingly, the signals which are transmitted from each of the fabric ports on the leaf switches are at different wavelengths, in order to avoid crosstalk when they are combined onto a single one of the connections C1, C2 (C3, C4), which, again, may be in the form of pairs of optical fibres, one of the pair being responsible for transmission of signals in the "upward" direction, the other being responsible for transmission of signals in the "downward" direction.

The multiplexed signals then traverse the gap between the leaf rack unit $R_L$ and spine rack unit $R_{S1}$ ($R_{S2}$) on the connections C1, C2 (C3, C4), whereupon they arrive at the spine rack unit $R_{S1}$ ($R_{S2}$), which is associated with the first dimension, and specifically the arrayed waveguide gratings $AWG_{S1,1}$ and $AWG_{S2,1}$ ($AWG_{S5,2}$ and $AWG_{S6,2}$) located thereon. As is shown, there is an arrayed waveguide grating $AWG_{S1,1}$ and $AWG_{S2,1}$ associated with (i.e. connected to) each of the arrayed waveguide gratings $AWG_{L1,1}$ and $AWG_{L2,1}$ ($AWG_{L1,2}$ and $AWG_{L2,2}$), and accordingly associated with each of the leaf switches L1 and L2.

The arrayed waveguide gratings $AWG_{S1,1}$ and $AWG_{S2,1}$ ($AWG_{S5,2}$ and $AWG_{S6,2}$) on the spine rack unit $R_{S1}$ ($R_{S2}$) then separate the signals on connections C1, C2 (C3, C4) into their two constituent signals, which are equivalent/identical to, or correspond to the signals departing the fabric ports on the leaf switches L1 and L2 with which that arrayed waveguide grating $AWG_{S1,1}$ and $AWG_{S2,1}$ ($AWG_{S5,2}$ and $AWG_{S6,2}$) is associated. As is shown, each of the demultiplexed signals is then directed towards a different one of the spine switches S1 or S2 (S5 or S6). The spine rack unit $R_{S1}$ ($R_{S2}$) includes a fibre shuffle F1 (F2), which includes four connections (again in the form of pairs of optical fibres, with one of the pair responsible for "upward" travel, and the other responsible for "downward" travel), providing an interconnection between each of the arrayed waveguide gratings $AWG_{S1,1}$ and $AWG_{S2,1}$ ($AWG_{S5,2}$ and $AWG_{S6,2}$), and each of the spine switches S1 and S2 (S5 and S6). These connections are confined to the spine rack unit $R_{S1}$ ($R_{S2}$), rather than having to traverse the gap between the leaf rack unit $R_L$ and spine rack unit $R_{S1}$ ($R_{S2}$). In the embodiment of FIG. 5, the fibre shuffle provides a full-mesh connection between the arrayed waveguide gratings $AWG_{S1,1}$ and $AWG_{S2,1}$ ($AWG_{S5,2}$ and $AWG_{S6,2}$) and the spine switches S1 and S2 (S5 and S6).

The spine switches S1 and S2 (S5 and S6), on receiving the signals from the arrayed waveguide gratings $AWG_{S1,1}$ and $AWG_{S2,1}$ ($AWG_{S5,2}$ and $AWG_{S6,2}$) then switch the signals towards one of their fabric ports. The spine switches may be in the form of electronic packet switches, optical circuit switches or a hybrid of the two which may be referred to as optoelectronic packet switches, though the nature of the switching does not matter for the purposes of this invention. Each of the spine switches S1 and S2 (S5 and S6) may then send a (now switched) optical signal back towards each of the arrayed waveguide gratings $AWG_{S1,1}$ and $AWG_{S2,1}$ ($AWG_{S5,2}$ and $AWG_{S6,2}$), via the fibre shuffle F1 (F2). When travelling in the opposite direction, the arrayed waveguide gratings $AWG_{S1,1}$ and $AWG_{S2,1}$ ($AWG_{S5,2}$ and $AWG_{S6,2}$) behave as multiplexers, and combine the up to two signals into a single one of the connections C1, C2 (C3, C4), though this time, it is the other of the pair of optical fibres, that which is responsible for "downward" signals.

The signal then traverses the gap between the spine rack unit $R_{S1}$ ($R_{S2}$) and the leaf rack unit $R_L$, and arrives at one of the arrayed waveguide gratings $AWG_{L1,1}$ and $AWG_{L2,1}$ ($AWG_{L1,2}$ and $AWG_{L2,2}$) whereupon it is demultiplexed into its up to two constituent signals. It should be noted that in the embodiment shown in FIG. 5, the arrayed waveguide gratings $AWG_{L1,1}$ and $AWG_{L2,1}$ ($AWG_{L1,2}$ and $AWG_{L2,2}$), and $AWG_{S1,1}$ and $AWG_{S2,1}$ ($AWG_{S5,2}$ and $AWG_{S5,2}$) are able to act as both multiplexers and demultiplexers, depending on which way the signal is travelling therethrough. This is due to the passive nature of an arrayed waveguide grating. However, in other embodiments, a separate component may be used to perform the multiplexing and demultiplexing duties of each of these arrayed waveguide gratings $AWG_{L1,1}$ and $AWG_{L2,1}$ ($AWG_{L1,2}$ and $AWG_{L2,2}$) and $AWG_{S1,1}$ and $AWG_{S2,1}$ ($AWG_{S5,2}$ and $AWG_{S6,2}$). Once the multiplexed signals are separated by the arrayed waveguide gratings $AWG_{L1,1}$ and $AWG_{L2,1}$ ($AWG_{L1,2}$ and $AWG_{L2,2}$), they are sent back to the leaf switches L1 and L2, whereupon they may be forwarded to an external client device (not shown), via a client port.

In the above scheme, it should be noted that the arrayed waveguide gratings $AWG_{L1,1}$ and $AWG_{L2,1}$ ($AWG_{L1,2}$ and $AWG_{L2,2}$) and $AWG_{S1,1}$ and $AWG_{S2,1}$ ($AWG_{S5,2}$ and $AWG_{S6,2}$), as well as the fibre shuffle F1 (F2) are entirely passive components and perform no active switching action. The only active switching action is performed by the leaf switches L1 and L2, and the spine switches S1 and S2 (S5 and S6), in that based on information contained in the signals, which may be packets of data or the like, the spine switches S1 and S2 (S5 and S6) and leaf switches L1 and L2 are able to select an appropriate fabric port to which to send a signal so that it will be directed towards its intended destination.

Figure 6A:
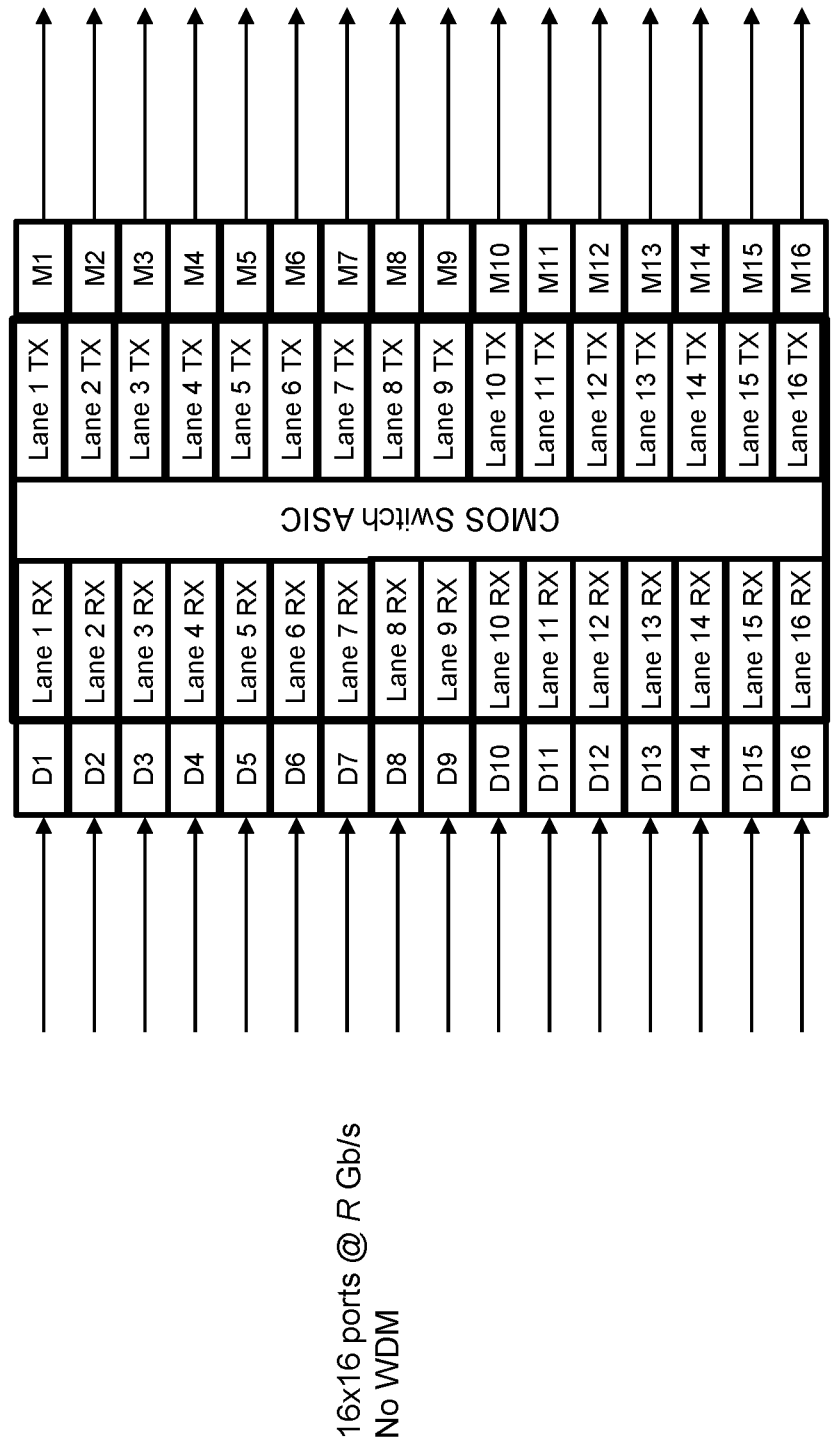
FIGS. 6A to 6F show schematic diagrams of individual switching elements which may be used in embodiments of the present invention.
Figure 6B:
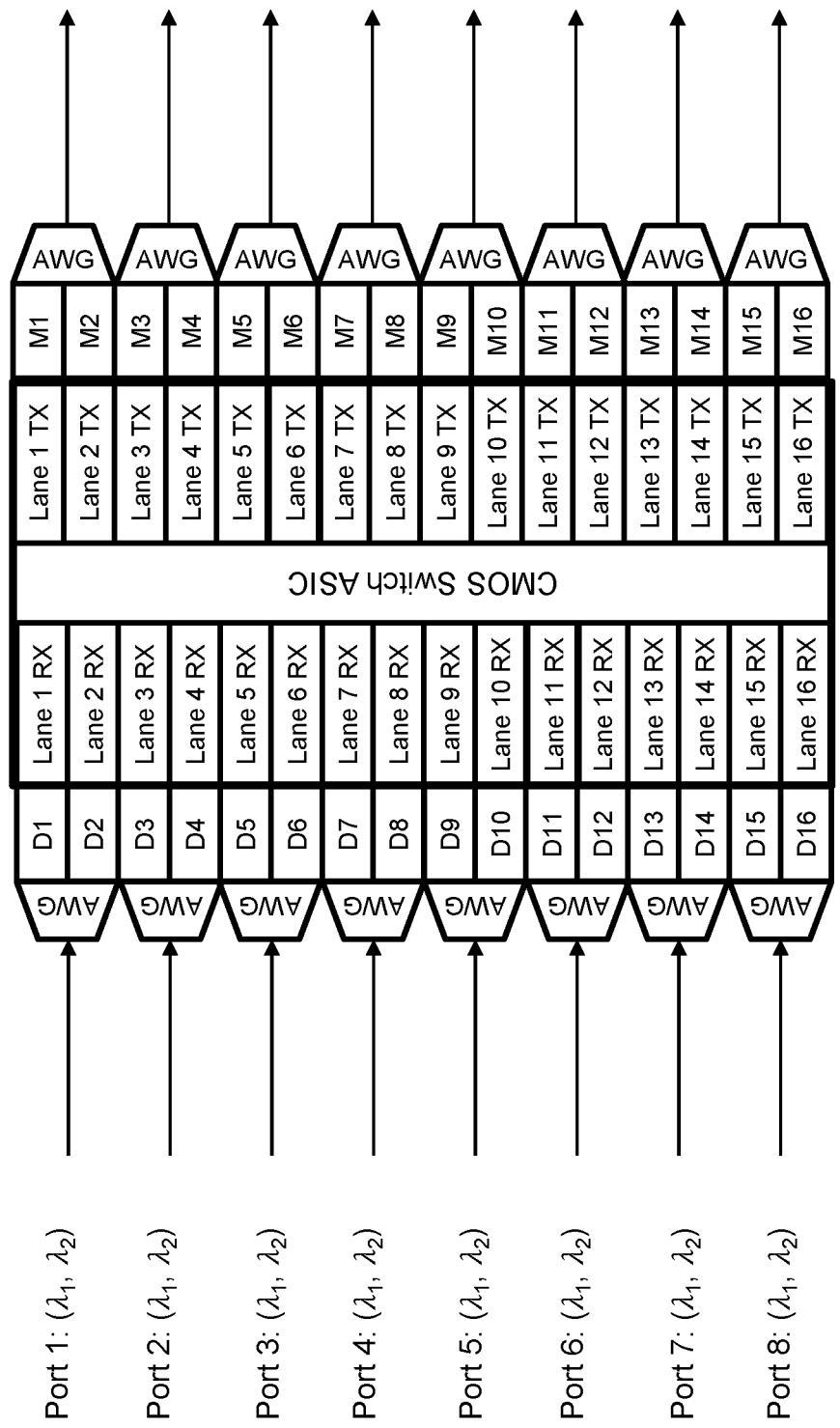
Figure 6C:
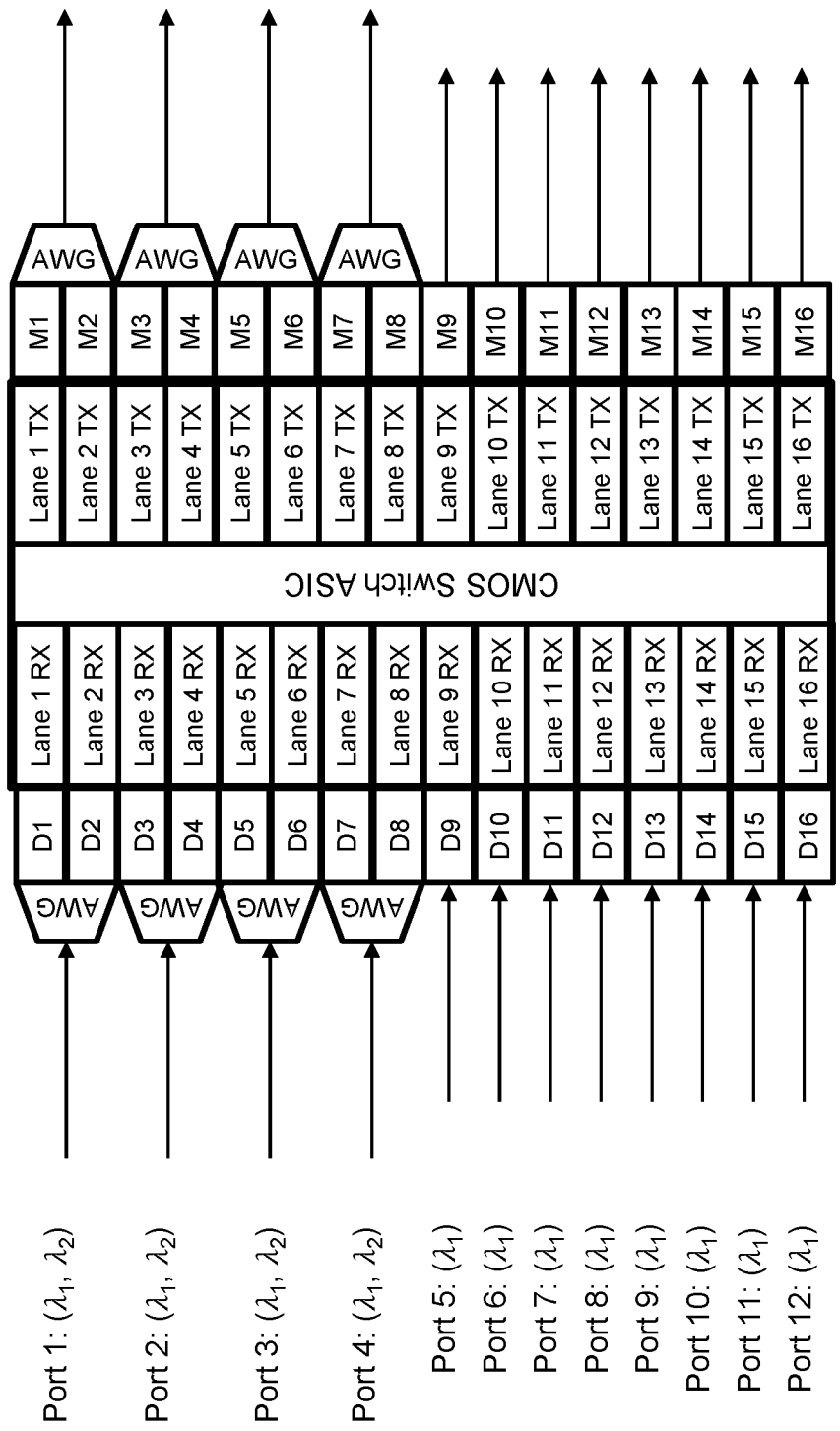
Figure 6D:
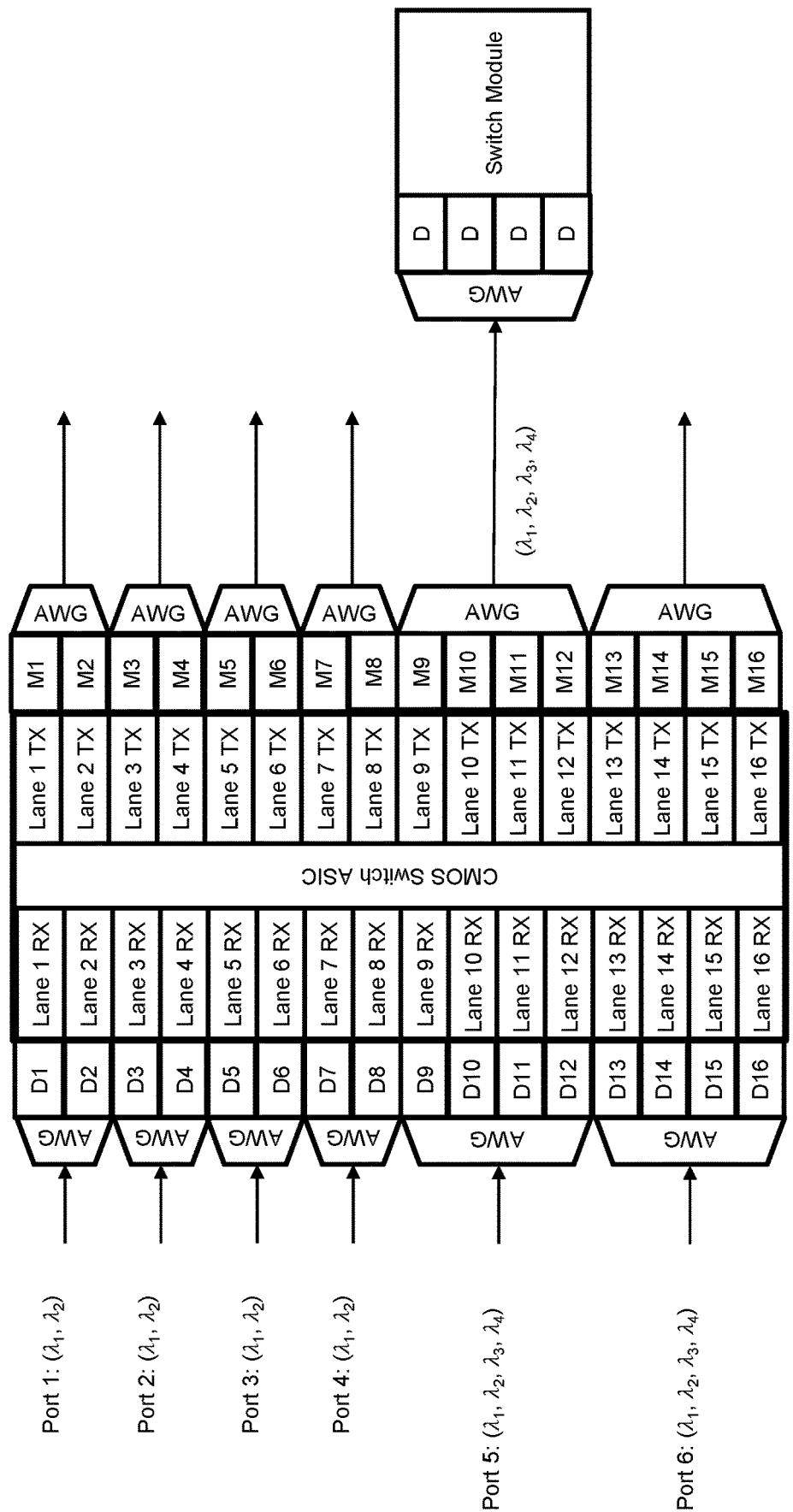
Figure 6E:
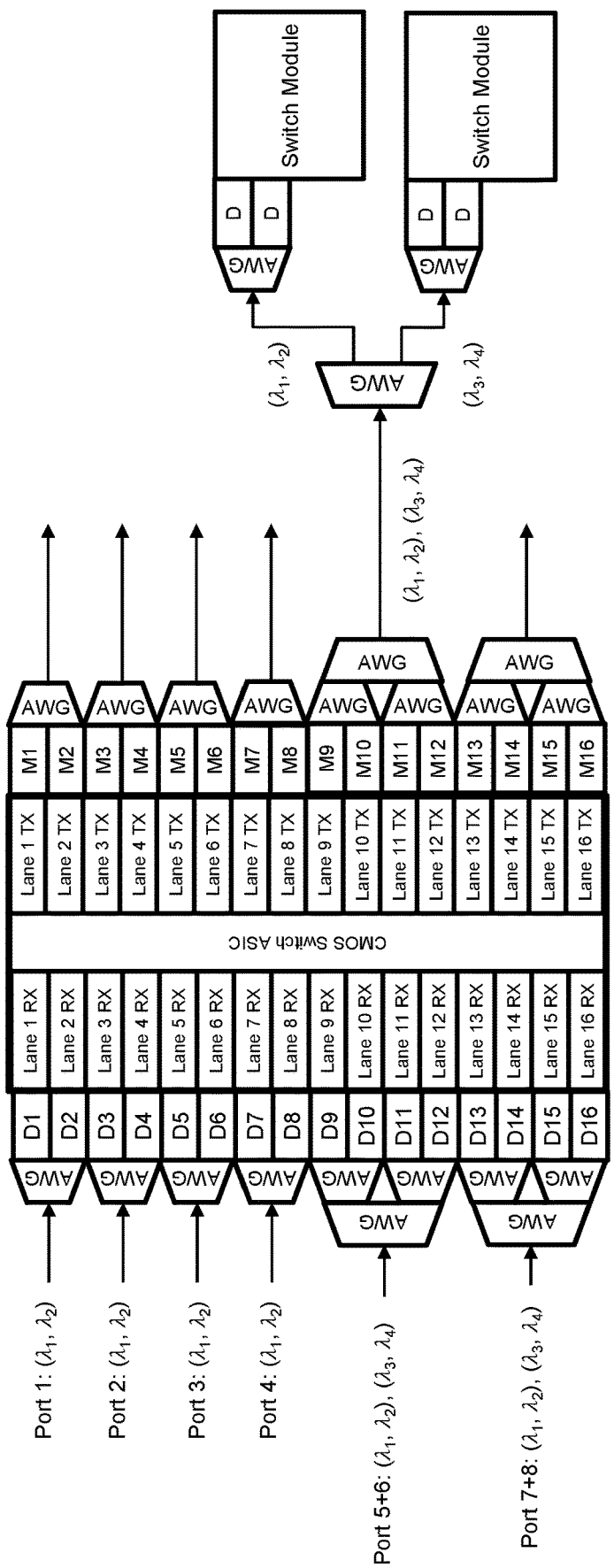
Figure 6F:
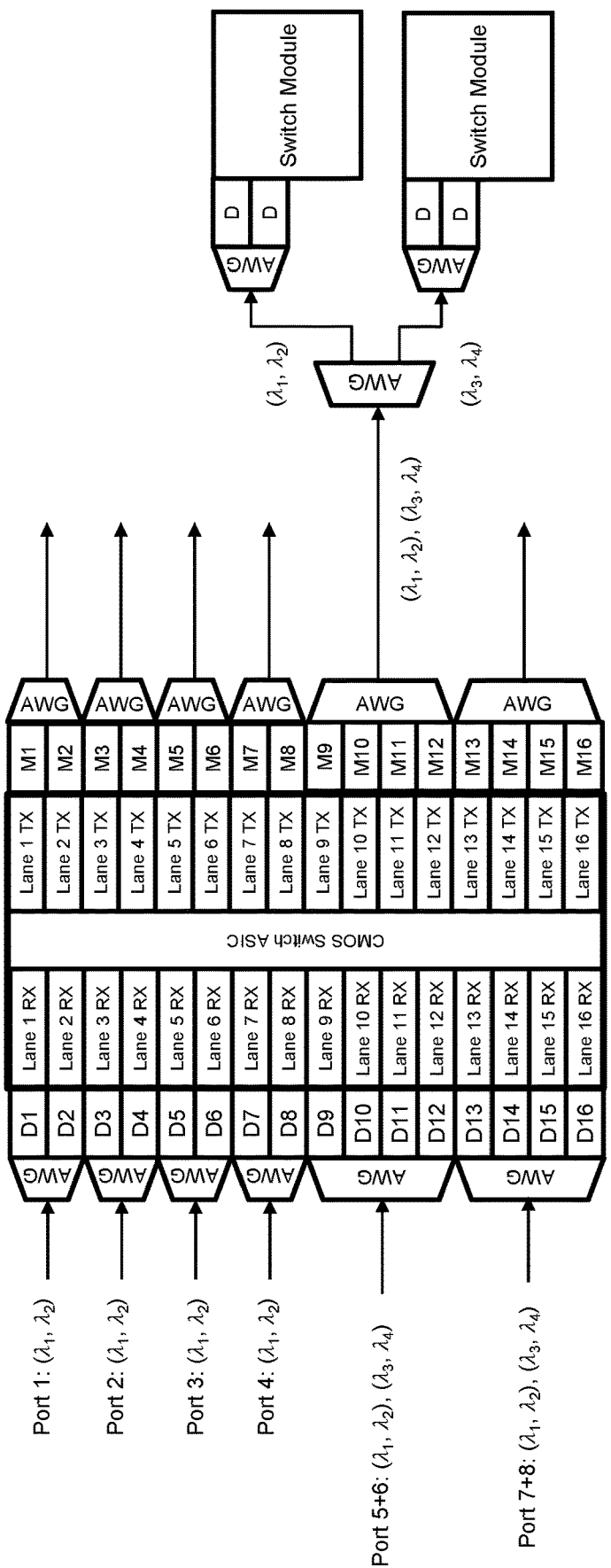
Figure 7:
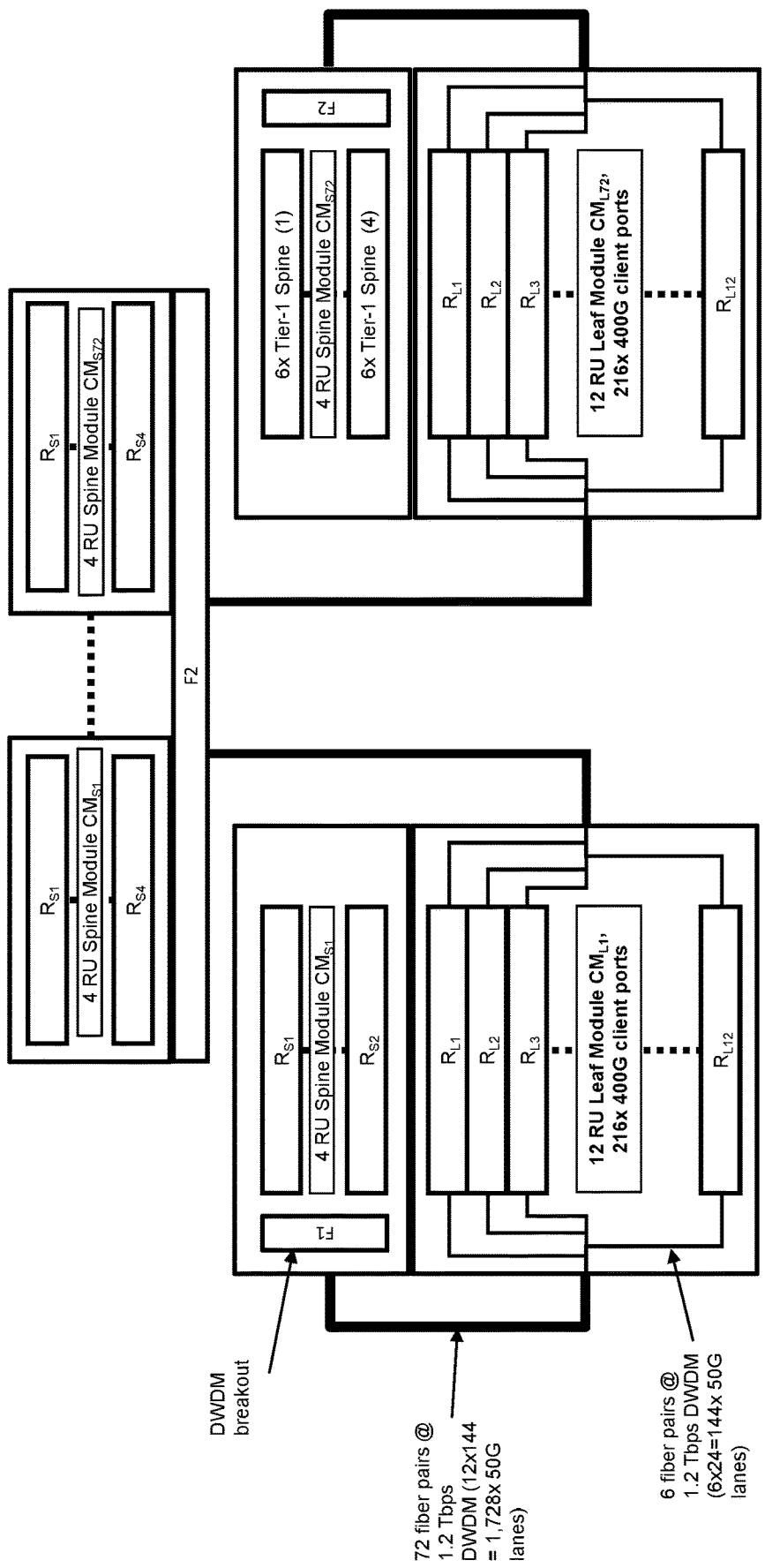
FIG. 7 shows a large-scale realistic example of a two-dimensional optoelectronic switch according to an embodiment of the present invention.

FIG. 7 shows a more realistic scale of optoelectronic switch according to an embodiment of the present invention. However in order to understand it better, it will be useful to demonstrate some examples of leaf switches and spine switches which may be used in the present invention. These are shown in FIGS. 6A to 6F. In particular, these drawings highlight the versatility of the switch modules which may be used in the present invention. All of the switch modules shown in FIGS. 6A to 6F share the same basic structure. Specifically, each of the switch modules 100 may be divided into a receiving side Rx and a transmission side Tx. The switch modules 100 include sixteen physical lanes denoted as "Lanes 1 to 16 Rx" and "Lanes 1 to 16 Tx" in FIGS. 6A to 6F. Each of the physical lanes on the Tx has an input in the form of a detector D1 to D16, which is configured to convert an optical signal into an electrical signal, and may be e.g. a photodetector such as a photodiode. Separating the receiving side Rx and the transmission side Tx is the CMOS switch ASIC, which is responsible for the actual switching function of the switch module 100, performing functions such as packet processing and routing (though this falls outside the scope of this application). The outputs from the physical lanes on the transmission side Tx are incident upon modulators M1 to M16, which may be in the form, for example, of electro-absorption modulators, and are configured to convert electrical signals into optical signals.

FIG. 6A is a simple example in which there is no multiplexing at all, there are sixteen physical lanes, which may be arranged into switch ports in many different ways, e.g. sixteen one-lane ports, eight two-lane ports or four four-lane ports. FIG. 6B shows an example in which the sixteen physical lanes are grouped into eight two-lane ports, in which an AWG is used to multiplex the signals carried by the two physical lanes per port, using two different wavelengths of light. Similarly, FIG. 6B shows a switch module in which the sixteen physical lanes are grouped into twelve ports: four two-lane ports (the signals multiplexed by an AWG, using two wavelengths) and eight one-lane ports (no multiplexing, and hence only one associated wavelength).

FIGS. 6D to 6F include illustrative diagrams of the connectivity with other switch modules. FIG. 6D shows a switch module with the sixteen physical lanes grouped into six ports: four two-lane ports (with two WDM wavelengths) and two four-lane ports (with four WDM wavelengths). The connection of one fibre pair to another switch module is also shown. Similarly, FIG. 6E shows a switch module with its sixteen lanes grouped into eight two-lane ports. Ports P1 to P4 are each multiplexed onto one fibre pair each carrying two wavelengths, whereas ports P5 and P6 further multiplexed by another AWG into a single fibre pair carrying four wavelengths. The same is true of ports P7 and P8. For illustration, one fibre pair's connection to two remote switch modules is shown, with the corresponding AWGs (i.e. demultiplexers) at the remote end. Finally, and similarly, FIG. 6F shows the same arrangement as FIG. 6E, except the multiplexing is performed using a single layer, instead of two layers of AWG, which though it may appear identical to the previous example, is in fact different since it gives a 6×6 switch instead of an 8×8 switch, with breakout to different modules.

FIG. 7 shows a large-scale embodiment of a 2D optoelectronic switch according to the present invention, which is able to support 15,552×400 G client ports. The optoelectronic switch includes seventy-two leaf chassis modules $CM_{L1}$ to $CM_{L72}$, each having thereon twelve leaf rack units $R_{L1}$ to $R_{L12}$, each in turn having thereon six leaf switches. This gives a total of 72×72=5,184 leaf switches. In the embodiment shown, each of the leaf switches has a radix of seventy two, i.e. there are 72×50 G ports per leaf switch, of which twenty-four are client ports, twenty-four are for switching in a first dimension, and twenty-four are for switching in a second dimension. This means that 5,184× 24=124,416 50 G client ports or 15,552 400 G client ports may be supported. As discussed, there are twenty-four fabric ports on each leaf switch associated with switching in the first dimension. The outputs from each of these is multiplexed by an AWG (not shown) onto a single fibre pair. This means that the output from each leaf rack unit $R_{L1}$ to $R_{L12}$ is in the form of six fibre pairs. The above is true for each of the leaf chassis modules $CM_{L1}$ to $CM_{L72}$.

For switching in the first dimension, each of the fibre-pairs directs the DWDM signals to a respective spine chassis module $CM_{S1}$ to $CM_{S72}$ (i.e. there is one associated with each of the leaf chassis modules $CM_{L1}$ to $CM_{L72}$). Each of the spine chassis modules $CM_{S1}$ to $CM_{S72}$ includes four spine rack units $R_{S1}$ to $R_{S4}$, each having six spine switches thereon, and includes seventy-two AWGs (not shown), one associated with each of the leaf switches on the respective leaf chassis module $CM_{L1}$ to $CM_{L72}$. As with previous examples but on a larger scale, the spine chassis modules $CM_{S1}$ to $CM_{S72}$ each include a fibre shuffle F1, which provides a full-mesh connection between the seventy-two AWGs and the twenty-four spine switches. Such a full-mesh connection requires 1,728 fibre pairs, but they are all confined to the spine chassis modules $CM_{S1}$ to $CM_{S72}$, rather than spanning the gap between the spine chassis modules $CM_{S1}$ to $CM_{S72}$ and leaf chassis modules $CM_{L1}$ to $CM_{L72}$. After switching by the spine switches, the signal returns by the same route, though its destination leaf switch, which will still be on the same leaf chassis module $CM_{L1}$ to $CM_{L72}$ (since switching in the first dimension does not allow the signal to "escape" the leaf chassis module $CM_{L1}$ to $CM_{L72}$ from which it originated), will not be the same.

Switching in the second dimension is slightly different. In the second dimension, each leaf switch is again connected to 24 spine switches. Each of these 24 spine switches are packaged onto the same module, meaning that all 24 fabric ports may be combined into a single fibre. This means that there could be 5,184 global fibres carrying 24×50 G=1.2 Tb/s each, for a total bandwidth of 6,220,800 Gb/s, which is identical to the aggregate client bandwidth (ensuring full bisection bandwidth).

Figure 8:
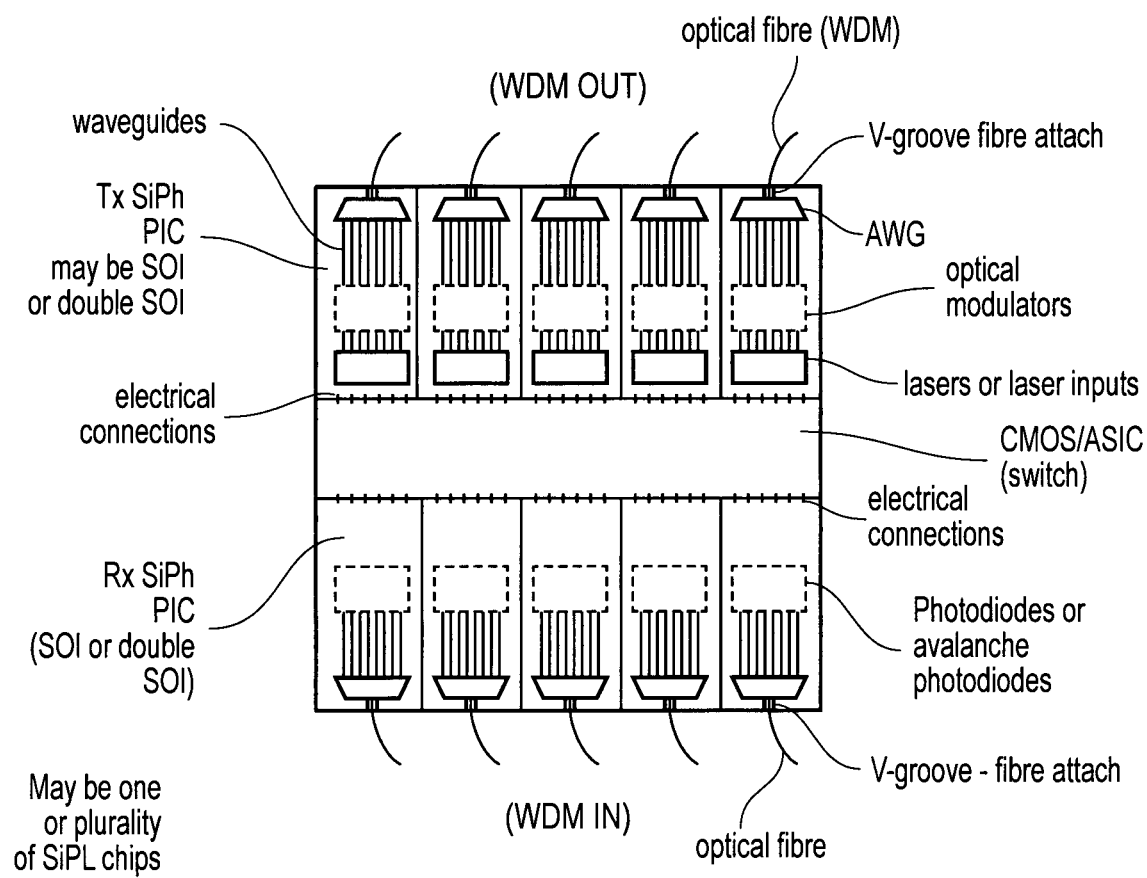

FIG. 8 shows a schematic view of a leaf switch which may be used in optoelectronic switches according to the present invention. All of the individual components of the leaf switch are integrated onto a single module. In doing so, optical loss may be reduced as the optical signal travels from an output of the switching part of the leaf switch to the multiplexer in question. In the example shown in FIG. 8 the DRM arrangement is provided by a silicon photonics circuit. The outputs of the multiplexers and demultiplexers are coupled to an optical fibre using a V-groove attach as described in more detail in WO2018/011587 (see e.g. FIG. 4), by the same applicant. In the example shown, the switching part of the leaf switch is provided by a CMOS. The laser used to generate light at the required wavelengths may be either present on the leaf switch itself, or external.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. An N-dimensional optoelectronic switch for transferring a signal from a source external client device to a destination external client device, the optoelectronic switch including:
   a plurality of leaf switch assemblies arranged in an N-dimensional array, each leaf switch assembly in the array having an associated N-tuple of co-ordinates giving the location of that leaf switch in each of the N dimensions, wherein each leaf switch assembly is a member of N sub-arrays of leaf switch assemblies, each of the N sub-arrays of which a given leaf switch assembly is a member being associated with a respective one of the N dimensions, and each sub-array having an associated spine rack unit,
   wherein:
   each leaf switch assembly includes:
      a leaf switch having N sets of fabric ports, a set of fabric ports associated with switching in each of the N dimensions, each set of fabric ports including a first fabric port and a second fabric port, and
      a fabric port multiplexer associated with the leaf switch, arranged to combine a first signal from the first fabric port of a first set of fabric ports of the N sets of fabric ports and a second signal from the second fabric port of the first set of fabric ports onto a first connection, in the form of an outgoing first multiplexed signal;
   each spine rack unit includes:
      a plurality of spine switches including a first spine switch having a fabric port and a second spine switch having a fabric port, and
      a demultiplexer arranged to separate an incoming multiplexed signal received from the first connection into the first signal and the second signal, the first signal directed towards the fabric port of the first spine switch and the second signal directed to the fabric port of the second spine switch;
   each leaf switch in a given leaf switch assembly is able to direct a signal from a fabric port associated with a first dimension, towards a fabric port associated with a second dimension; and
   N is an integer greater than 1.

2. An optoelectronic switch according to claim 1, further including:
   a leaf rack unit having thereon a first leaf switch assembly of the plurality of leaf switch assemblies including:
      a first leaf switch having a plurality of fabric ports including a first fabric port and a second fabric port, and
      a first fabric port multiplexer associated with the first leaf switch, arranged to combine:
         a fifth signal, the fifth signal being the first signal from the first fabric port of the first set of fabric ports of the first leaf switch and
         a sixth signal, the sixth signal being the second signal from the second fabric port of the first set of fabric ports of the first leaf switch onto the first connection, in the form of an outgoing first multiplexed signal; and
   a first spine rack unit including:
      a plurality of spine switches including a first spine switch having a fabric port and a second spine switch having a fabric port, and
      a first demultiplexer arranged to separate an incoming multiplexed signal received from the first connection into the fifth signal and the sixth signal, the fifth signal being directed towards the fabric port of the first spine switch of the first spine rack unit and the sixth signal being directed towards the fabric port of the second spine switch of the first spine rack unit.

3. An optoelectronic switch according to claim 2, wherein the first leaf switch assembly further includes a fabric port demultiplexer associated with the first leaf switch, arranged to separate an incoming second multiplexed signal received from a second connection into a third signal directed towards the first fabric port of the first set of fabric ports of the first leaf switch, and a fourth signal directed towards the second fabric port of the first set of fabric ports of the first leaf switch.

4. An optoelectronic switch according to claim 3, wherein:
   each of the plurality of fabric ports of the first leaf switch is arranged to convey a respective signal, and
   the fabric port demultiplexer is arranged to separate the second multiplexed signal from the second connection into a plurality of constituent signals, a respective one of which is directed towards each of the plurality of fabric ports.

5. An optoelectronic switch according to claim 3, wherein the first fabric port multiplexer and the fabric port demultiplexer are provided by the same component.

6. An optoelectronic switch according to claim 3, wherein the first leaf switch and the first fabric port multiplexer and/or the fabric port demultiplexer are integrated into a single leaf switch module, located on the leaf rack unit.

7. An optoelectronic switch according to claim 3, wherein the first fabric port of the first set of fabric ports of the first leaf switch includes a plurality of physical lanes and has an associated lane multiplexer, the lane multiplexer arranged to combine signals from each of the plurality of physical lanes to form the fifth signal, and wherein each one of the plurality of fabric ports of the first leaf switch includes a plurality of physical lanes and an associated lane multiplexer, each of the lane multiplexers being arranged to combine signals from the plurality of physical lanes of the fabric port with which that lane multiplexer is associated.

8. An optoelectronic switch according to claim 7, wherein the first fabric port of the first set of fabric ports of the first leaf switch has an associated lane demultiplexer, the lane demultiplexer arranged to separate the third signal into a plurality of constituent signals, each directed to a respective one of the plurality of physical lanes, and wherein each one of the plurality of fabric ports of the first leaf switch includes an associated lane demultiplexer, each of the lane demultiplexers being arranged to separate signals from the fabric port with which it is associated into a plurality of constituent signals, each of which is directed to a respective one of the physical lanes of that fabric port.

9. An optoelectronic switch according to claim 3, wherein the first spine rack unit further includes a multiplexer arranged to combine the third signal from the first spine switch of the first spine rack unit and the fourth signal from the second spine switch of the first spine rack unit onto the second connection in the form of the second multiplexed signal.

10. An optoelectronic switch according to claim 9, wherein:
a respective fabric port on each of the plurality of spine switches on the first spine rack unit is arranged to convey a respective signal; and
the multiplexer on the first spine rack unit is arranged to combine the signals from the fabric ports of each respective one of the plurality of spine switches on the first spine rack unit onto the second connection, in the form of the second multiplexed signal.

11. An optoelectronic switch according to claim 9, wherein the first demultiplexer and the multiplexer on the first spine rack unit are provided by the same component.

12. An optoelectronic switch according to claim 9, wherein each leaf switch assembly of the plurality of leaf switch assemblies on the leaf rack unit has an associated multiplexer and an associated demultiplexer on the first spine rack unit,
wherein the fabric port multiplexer on a given leaf switch assembly on the leaf rack unit is connected to its associated demultiplexer on the first spine rack unit via the first connection, and
wherein a fabric port demultiplexer on a given leaf switch assembly on the leaf rack unit is connected to an associated multiplexer on the first spine rack unit via the second connection.

13. An optoelectronic switch according to claim 9, wherein the fifth signal has a first wavelength and the sixth signal has a second wavelength different from the first wavelength, and
wherein the first fabric port multiplexer is arranged to combine the fifth signal and the sixth signal onto the first connection in the form of the first multiplexed signal associated with the first leaf switch, and the first demultiplexer on the first spine rack unit is arranged to direct signals having the first wavelength to the first spine switch of the first spine rack unit and signals having the second wavelength to the second spine switch of the first spine rack unit.

14. An optoelectronic switch according to claim 13, wherein the third signal has a third wavelength and the fourth signal has a fourth wavelength, the multiplexer on the first spine rack unit being arranged to combine the third signal and the fourth signal onto the second connection in the form of the second multiplexed signal, and the fabric port demultiplexer being arranged to direct signals having the third wavelength to the first fabric port of the first set of fabric ports of the first leaf switch, and signals having the fourth wavelength to the second fabric port of the first set of fabric ports of the first leaf switch.

15. An optoelectronic switch according to claim 14 wherein the first wavelength is the same as the third wavelength, and/or the second wavelength is the same as the fourth wavelength.

16. An optoelectronic switch according to claim 9, wherein each spine switch of the first spine rack unit includes a fabric port arranged to convey a signal having a respective associated wavelength, the multiplexer on the first spine rack unit arranged to combine the signal from each respective spine switch of the first spine rack unit into a multiplexed signal, and the fabric port demultiplexer being arranged to separate the multiplexed signal into its constituent signals, and to direct each constituent signal to a respective fabric port on the first leaf switch based on the wavelength of that constituent signal.

17. An optoelectronic switch according to claim 3, wherein the fabric port of the first spine switch on the first spine rack unit includes a plurality of physical lanes and has an associated lane multiplexer, the lane multiplexer arranged to combine signals from each of the plurality of physical lanes to form the third signal, and
wherein a respective fabric port of each one of the plurality of spine switches on the first spine rack unit includes a plurality of physical lanes and an associated lane multiplexer, each of the lane multiplexers being arranged to combine signals from the plurality of physical lanes of the fabric port with which that lane multiplexer is associated.

18. An optoelectronic switch according to claim 2, wherein:
each of the plurality of fabric ports of the first leaf switch is arranged to convey a respective signal, and
the first fabric port multiplexer is arranged to combine the respective signals from each of the plurality of fabric ports onto the first connection in the form of the first multiplexed signal associated with the first leaf switch.

19. An optoelectronic switch according to claim 2, wherein the fifth signal and the sixth signal are combined using wavelength-division multiplexing or dense wavelength-divisional multiplexing.

20. An optoelectronic switch according to claim 2, wherein the leaf rack unit has the plurality of leaf switch assemblies located thereon.

21. An optoelectronic switch according to claim 2, wherein:
a respective fabric port on each of the plurality of spine switches on the first spine rack unit is arranged to convey a respective signal; and
the first demultiplexer on the spine rack unit is arranged to separate the first multiplexed signal from the first connection into a plurality of constituent signals, a respective one of which is directed towards a fabric port on each of the plurality of spine switches.

22. An optoelectronic switch according to claim 2, wherein the fabric port of the first spine switch on the first spine rack unit includes a plurality of physical lanes and has an associated lane demultiplexer, the lane demultiplexer arranged to separate the fifth signal into a plurality of constituent signals, each directed to a respective one of the plurality of physical lanes, and wherein a respective fabric port of each one of the plurality of spine switches of the first spine rack unit includes a plurality of physical lanes and has an associated lane demultiplexer, each of the lane demultiplexers being arranged to separate signals arriving at that fabric port into a plurality of constituent signals, each of which is directed to a respective one of the plurality of physical lanes of that fabric port.

23. An optoelectronic switch according to claim 2, wherein there are a plurality of demultiplexers on the first spine rack unit, each arranged to separate an incoming multiplexed signal from a single connection into its constituent signals, each of the constituent signals being directed to a respective spine switch of the plurality of spine switches on the first spine rack unit.

24. An optoelectronic switch according to claim 23, wherein there are a plurality of multiplexers on the first spine rack unit, each arranged to combine a plurality of signals each from a respective one of the plurality of spine switches of the first spine rack unit, onto a single connection, in the form of an outgoing multiplexed signal.

25. An optoelectronic switch according to claim 24, wherein, on the first spine rack unit, an optical interconnecting region provides a full-mesh connection between each of the multiplexers and/or demultiplexers and each of the spine switches.

26. An optoelectronic switch according to claim 2, wherein each fabric port on the first leaf switch is arranged to convey a signal having a respective associated wavelength, wherein no two fabric ports in the plurality of fabric ports on the first leaf switch have the same associated wavelength, the first fabric port multiplexer being arranged to combine the signal from each respective fabric port into a multiplexed signal, and the first demultiplexer on the first spine rack unit arranged to separate the multiplexed signal into its constituent signals, and to direct each constituent signal to a respective spine switch, based on the wavelength of that constituent signal.

* * * * *